United States Patent
Takahashi et al.

(10) Patent No.: US 12,539,600 B2
(45) Date of Patent: Feb. 3, 2026

(54) ROBOT SYSTEM, METHOD OF CONTROLLING THE ROBOT SYSTEM, RECORDING MEDIUM, METHOD OF TEACHING THE ROBOT SYSTEM, AND METHOD OF MANUFACTURING PRODUCTS

(71) Applicant: CANON KABUSHIKI KAISHA, Tokyo (JP)

(72) Inventors: Masakazu Takahashi, Tokyo (JP); Hideki Nakamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 420 days.

(21) Appl. No.: 18/063,206

(22) Filed: Dec. 8, 2022

(65) Prior Publication Data
US 2023/0191592 A1   Jun. 22, 2023

(30) Foreign Application Priority Data

Dec. 17, 2021 (JP) .................. 2021-205340
Nov. 15, 2022 (JP) .................. 2022-182290

(51) Int. Cl.
*B25J 9/00* (2006.01)
*B25J 9/16* (2006.01)
(Continued)

(52) U.S. Cl.
CPC .......... *B25J 9/0081* (2013.01); *B25J 9/1633* (2013.01); *B25J 9/1664* (2013.01); *B25J 13/081* (2013.01); *B25J 19/00* (2013.01)

(58) Field of Classification Search
CPC ...... B25J 9/0081; B25J 9/1633; B25J 9/1664; B25J 13/081; B25J 19/00; B25J 9/1656; B25J 9/04; B25J 9/16; B25J 9/1602; G05B 2219/39339; G05B 2219/40581; G05B 19/423
See application file for complete search history.

(56) References Cited

U.S. PATENT DOCUMENTS

2019/0248006 A1   8/2019   Takahashi
2020/0147787 A1   5/2020   Takahashi
(Continued)

FOREIGN PATENT DOCUMENTS

JP   2017-202554 A   11/2017
JP   2019-18340 A    2/2019
(Continued)

OTHER PUBLICATIONS

European Search Report dated May 10, 2023 issued in corresponding European counterpart application No. 22212184.0.
(Continued)

*Primary Examiner* — Ian Jen
(74) *Attorney, Agent, or Firm* — VENABLE LLP

(57) ABSTRACT

A robot system includes a robot and a control portion. The robot includes a contact detection portion configured to output a signal in accordance with contact performed by a user. The control portion is configured to control resistance of the robot applied to the user when the user moves the robot, in accordance with a number of contact positions at which the user contacts the robot, based on a signal from the contact detection portion.

17 Claims, 30 Drawing Sheets

(51) Int. Cl.
    *B25J 13/08*         (2006.01)
    *B25J 19/00*         (2006.01)

(56) References Cited

U.S. PATENT DOCUMENTS

| | | |
|---|---|---|
| 2021/0237267 A1 | 8/2021 | Kim et al. |
| 2022/0134560 A1* | 5/2022 | Ba .................. B62D 57/032 700/246 |
| 2023/0123322 A1* | 4/2023 | Cella ............... G05B 23/0283 700/29 |
| 2024/0005598 A1* | 1/2024 | Sucar ................... G06T 7/70 |

FOREIGN PATENT DOCUMENTS

| | | |
|---|---|---|
| JP | 2020-151807 A | 9/2020 |
| JP | 2021-121451 A | 8/2021 |

OTHER PUBLICATIONS

Kronander et al., Learning Compliant Manipulation through Kinesthetic and Tactile Human-Robot Interaction, IEEE Transactions on Haptics, vol. 7, No. 3, Sep. 12, 2014, pp. 367-380.
Ren et al., Design of Direct Teaching Behavior of Collaborative Robot Based on Force Interaction, Journal of Intelligent & Robotic Systems, Jan. 22, 2019, pp. 83-93.

\* cited by examiner

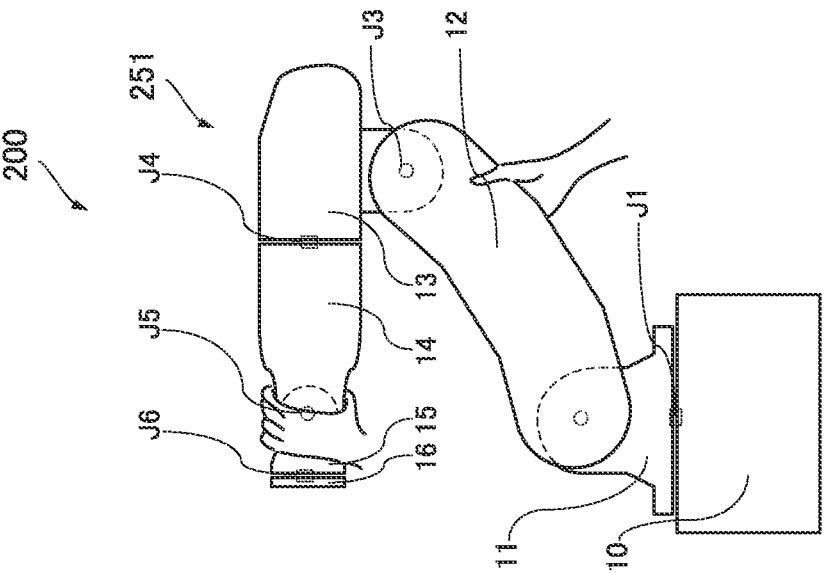
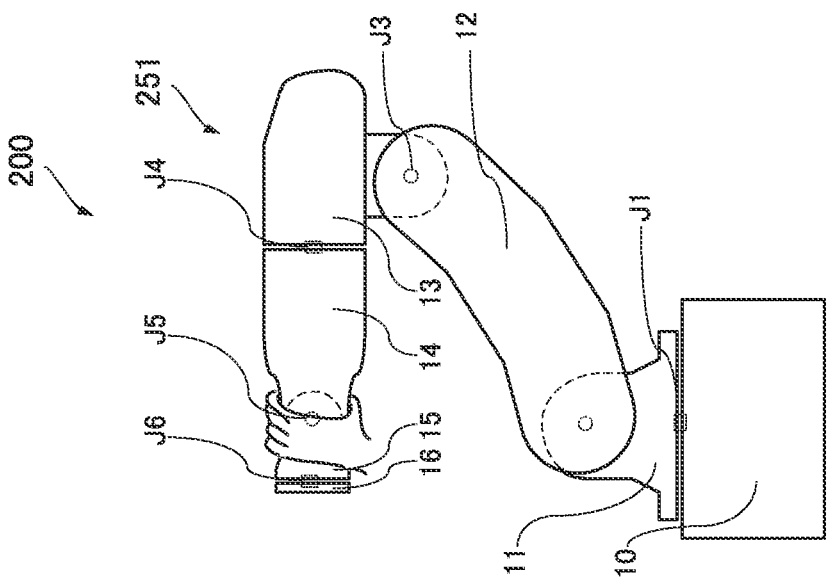
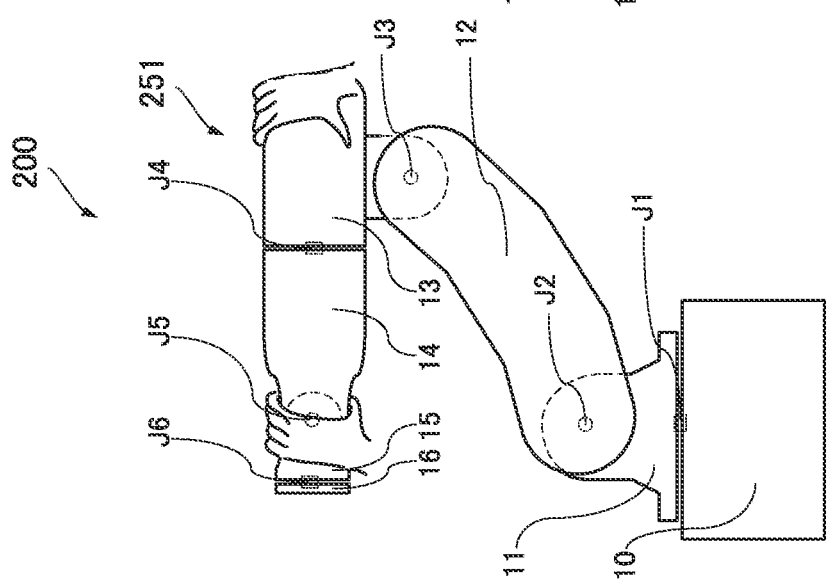

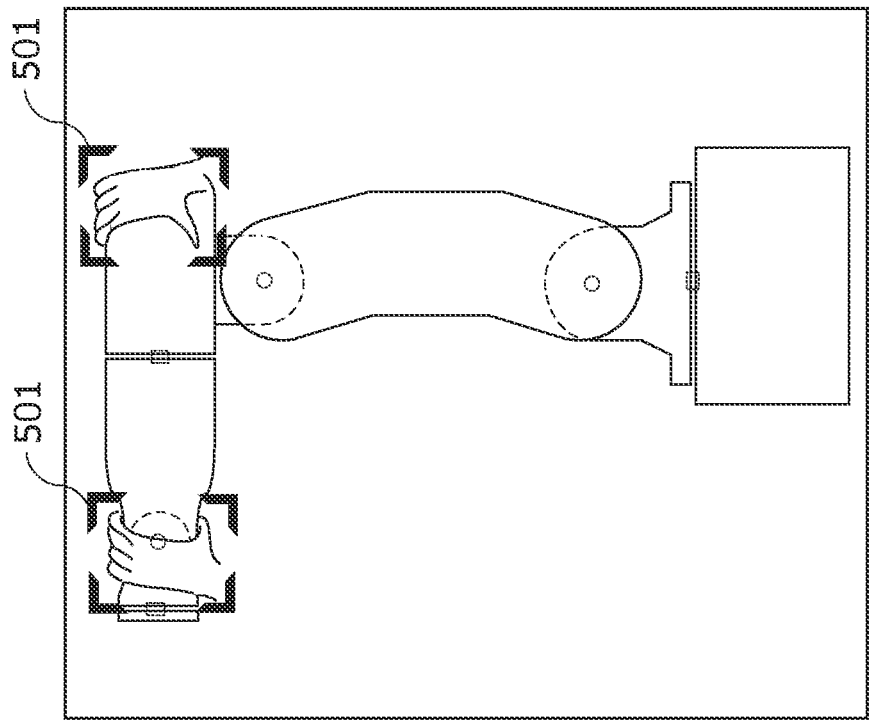
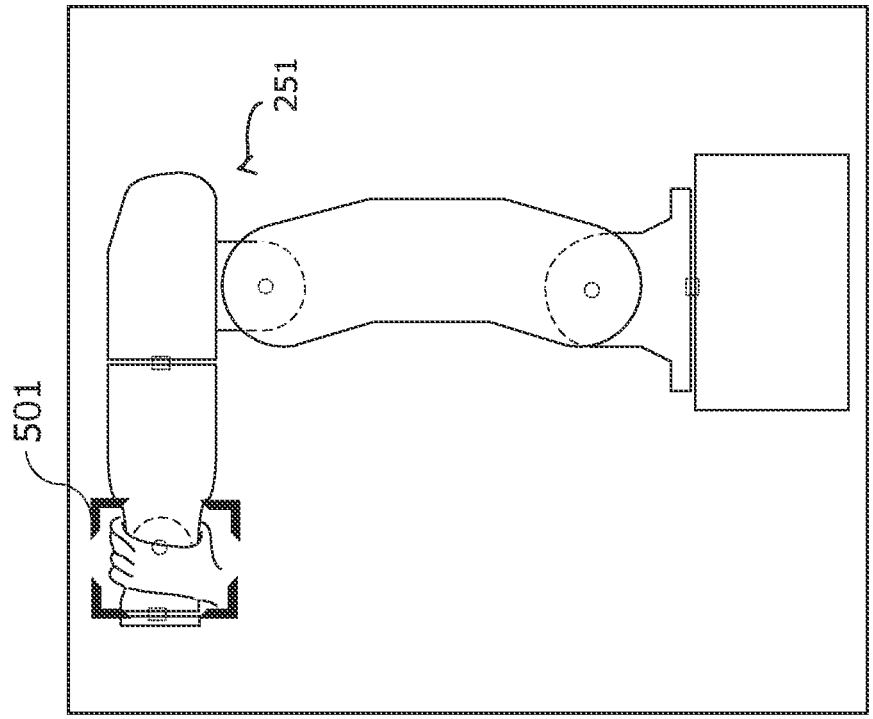

ROBOT SYSTEM, METHOD OF CONTROLLING THE ROBOT SYSTEM, RECORDING MEDIUM, METHOD OF TEACHING THE ROBOT SYSTEM, AND METHOD OF MANUFACTURING PRODUCTS

BACKGROUND OF THE INVENTION

Field of the Invention

The present invention relates to a robot system, a method of controlling the robot system, and the like.

Description of the Related Art

When a robot system with a robot arm, such as a six-axis articulated robot arm, is installed in a manufacturing line, an operator teaches the robot system a trajectory of the robot arm in accordance with the work to be performed. The robot arm is driven along the trajectory, and the trajectory is constituted by positions and postures of the robot arm. In general, an operator teaches the robot system the trajectory while operating the robot arm by using, for example, a remote controller called a teaching pendant. However, remotely controlling the robot arm by using the remote controller is difficult, and thus the operability of the teaching pendant for the teaching is not good.

For this reason, a robot system on which a so-called direct teaching mode is performed is proposed. In the direct teaching mode, an operator teaches the robot system a trajectory of the robot arm, by directly moving the robot arm with the operator's hand (human hand). Japanese Patent Application Publication No. 2020-151807 describes a technique that easily moves a robot arm with a human hand. By the way, a robot arm includes brakes that restrain respective joints for preventing the robot arm from unexpectedly moving. The above-described technique releases a brake that corresponds to a portion of the robot arm held by a human hand, and thereby makes it easy to move the robot arm with a human hand.

SUMMARY OF THE INVENTION

According to a first aspect of the present invention, a robot system includes a robot and a control portion. The robot includes a contact detection portion configured to output a signal in accordance with contact performed by a user. The control portion is configured to control resistance of the robot applied to the user when the user moves the robot, in accordance with a number of contact positions at which the user contacts the robot, based on a signal from the contact detection portion.

According to a second aspect of the present invention, a robot system includes a robot and a control portion. The robot includes contact detection portion configured to output a signal in accordance with contact performed by a user, and an end-effector contact detection portion configured to output a signal when an object contacts the end effector. When that the object contacts the end effector is detected from a signal from the end-effector contact detection portion, the control portion performs control such that resistance of the end effector applied to the user when the user changes a posture of the end effector is made larger than the resistance of a link of the robot applied to the user when that the user contacts the link is detected from a signal from the contact detection portion.

According to a third aspect of the present invention, a method of controlling a robot system includes controlling, by a control portion, resistance of the robot applied to the user when the user moves the robot, in accordance with a number of contact positions at which the user contacts the robot, based on a signal from the contact detection portion. The robot includes a contact detection portion that outputs a signal in accordance with contact performed by a user.

According to a fourth aspect of the present invention, a method of teaching a robot system includes obtaining, by the control portion, a trajectory of the robot based on movement of the robot performed by the user while the control portion controls resistance of the robot applied to the user when the user moves the robot, depending on a signal from the contact detection portion, in accordance with a number of contact positions at which the user contacts the robot. The robot system includes a robot including a contact detection portion that outputs a signal in accordance with contact performed by a user, and a control portion.

According to a fifth aspect of the present invention, a method of manufacturing products by operating a robot system includes obtaining, by the control portion, a trajectory of the robot based on movement of the robot performed by the user while the control portion controls resistance of the robot applied to the user when the user moves the robot, depending on a signal from the contact detection portion, in accordance with a number of contact positions at which the user contacts the robot, and moving, by the control portion, the robot along the trajectory. The robot includes a contact detection portion that outputs a signal in accordance with contact performed by a user, and a control portion.

Further features of the present invention will become apparent from the following description of exemplary embodiments with reference to the attached drawings.

BRIEF DESCRIPTION OF THE DRAWINGS

FIG. 14 is a schematic diagram illustrating a state where the fourth link and the sixth link are held and operated.

FIG. 14B is a schematic diagram illustrating a state where a hand is separated from the fourth link in the state illustrated in FIG. 14A.

FIG. 14C is a schematic diagram illustrating a state where the third link is held in the state illustrated in FIG. 14B.

FIG. 29A is a schematic diagram of an image from an image capture apparatus 500 in which the image capture apparatus 500 determines a single contact position.

FIG. 29B is a schematic diagram of an image from the image capture apparatus 500 in which the image capture apparatus 500 determines two contact positions.

DESCRIPTION OF THE EMBODIMENTS

When a user moves a robot with his/her hand (human hand), the user will feel good operability if the user can roughly move the robot with one hand and slightly move the robot with both hands, for example. However, if the resistance of each joint is decreased for easily moving the robot with one hand, it becomes too easy to move the robot with both hands, and thus becomes difficult to slightly move the robot with both hands for adjustment. In contrast, if the resistance value of each joint is increased for moving the robot with both hands, it becomes difficult to move the robot with one hand. In addition, there is a case in which a user holds a teaching pendant with one hand for giving an instruction to a robot and operates the robot with the other hand. In this case, since the user holds the teaching pendant with one hand, the user has to put strength into the other hand for operating the robot arm. As a result, the hand that operates the robot arm gets tired easily.

The below-described embodiments are intended to provide a robot system, a method of controlling the robot system, and the like that can achieve good operability for moving a robot with a human hand.

First Embodiment

Hereinafter, a first embodiment for embodying the present invention will be described with reference to FIGS. 1 to 12. First, an outline of a robot system of the first embodiment will be described with reference to FIGS. 1 to 6.

Configuration of Robot System

Figure 1:
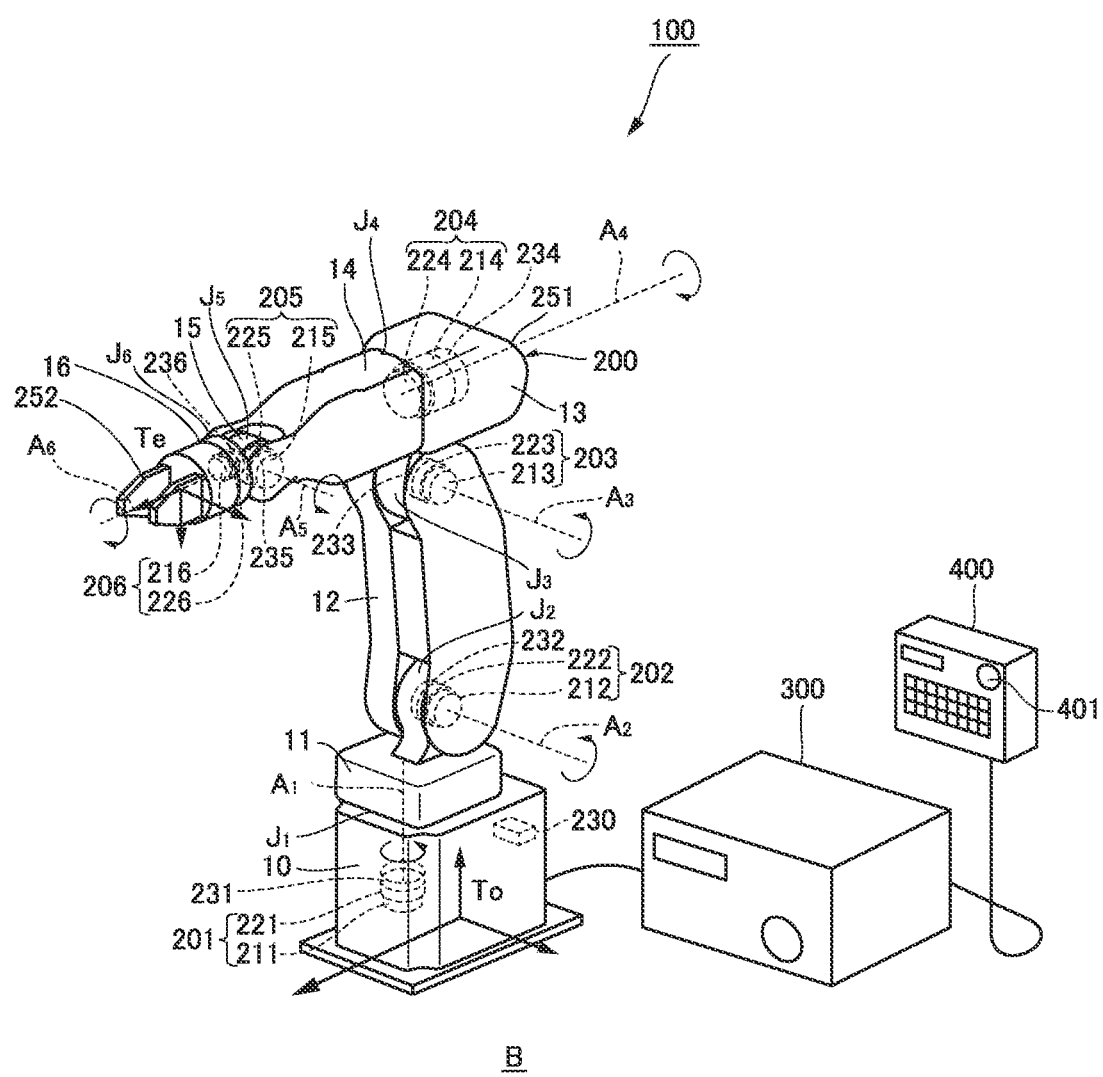
FIG. 1 is a perspective view illustrating a schematic configuration of a robot system of a first embodiment.
Figure 2:
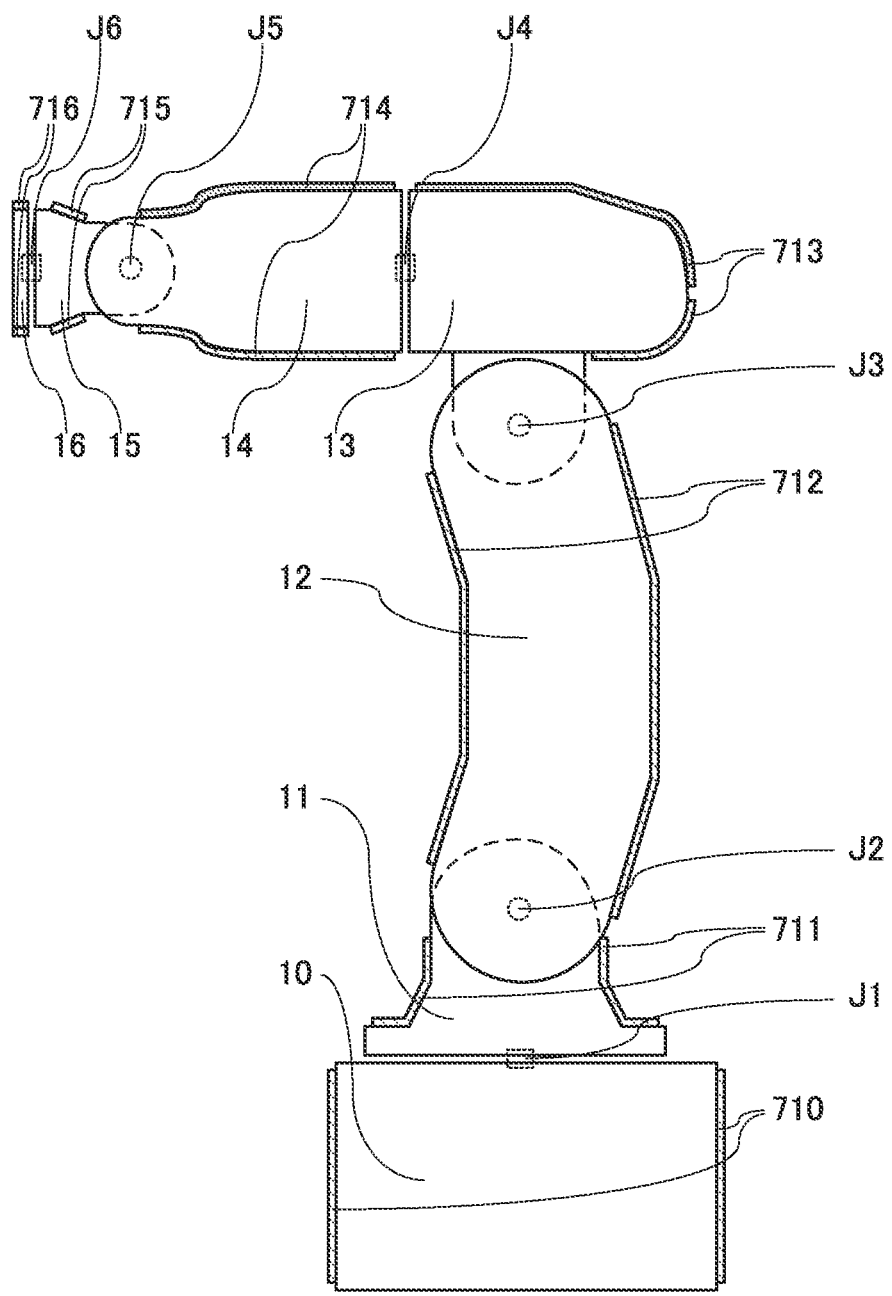
FIG. 2 is a schematic diagram illustrating a robot arm and contact sensors of the first embodiment.

FIG. 1 is a perspective view illustrating a schematic configuration of a robot system of the first embodiment. FIG. 2 is a schematic diagram illustrating a robot arm and contact sensors of the first embodiment. As illustrated in FIG. 1, a robot system 100 includes an articulated robot 200, and a control apparatus 300. The control apparatus 300 serves as a control portion that controls the operation of the robot 200. In addition, the robot system 100 also includes a teaching pendant 400. The teaching pendant 400 serves as a teaching apparatus (operation terminal) that sends teach data to the control apparatus 300. The teaching pendant 400 is operated by an operator, and is used for specifying the operation of the robot 200 and the control apparatus 300.

The robot 200 is a vertically articulated robot. Specifically, the robot 200 includes a vertically articulated robot arm 251, and a hand tool 252. The hand tool 252 serves as an end effector attached to the distal end of the robot arm 251. Hereinafter, the description will be made for a case where the end effector is the hand tool 252. However, the present disclosure is not limited to this. For example, the end effector may be a dedicated tool used for performing dedicated work. The base end of the robot arm 251 is fixed to a base B. The hand tool 252 holds (supports) an object, such as a part or a workpiece.

The robot 200, or the robot arm 251, includes a plurality of (e.g., six) joints $J_1$ to $J_6$ (that is, the robot arm 251 is a six-axis robot arm). The robot arm 251 includes a plurality of (e.g., six) servo motors 201 to 206 that respectively drive and rotate the joints $J_1$ to $J_6$ on joint axes $A_1$ to $A_6$.

In the robot arm 251, first to six links (frames) 10 to 15 are linked with each other so as to be able to be rotated by the joints $J_1$ to $J_6$. The first link 10, the second link 11, the third link 12, the fourth link 13, the fifth link 14, and the sixth link 15 are serially linked with each other in this order in a direction extending from the base end side toward the distal end side. The robot arm 251 can move the hand of the robot 200 (or the distal end of the robot arm 251) to any three-dimensional position within a movement range such that the hand takes any posture in any three directions.

The position and posture of the robot arm 251 can be expressed by using a coordinate system. A coordinate system To is fixed to the base end of the robot arm 251, that is, to the base B. A coordinate system Te is fixed to the hand of the robot 200 (i.e., the distal end of the robot arm 251).

Note that in the first embodiment, the hand of the robot 200 is the hand tool 252 if the hand tool 252 is not holding (supporting) any object. If the hand tool 252 is holding (supporting) an object, the hand of the robot 200 is both of the hand tool 252 and the object held (supported) by the hand tool 252 (for example, the hand is the tool and a part). That is, regardless of whether the hand tool 252 is holding an object, the hand of the robot 200 is a portion of the robot 200 located ahead of the distal end of the robot arm 251.

The servo motors 201 to 206 include electric motors (motors) 211 to 216 and sensor portions 221 to 226, respectively. The electric motors (motors) 211 to 216 respectively serve as driving sources that drive the joints $J_1$ to $J_6$. The sensor portions 221 to 226 are respectively connected to the electric motors 211 to 216. The sensor portions 221 to 226 respectively include position sensors (angle sensors) 551 to 556 (see FIG. 4) that serve as position detection portions. The position detection portions detect positions (angles) of the joints $J_1$ to $J_6$. That is, the position detection portions produce signals corresponding to the positions (angles) of the joints $J_1$ to $J_6$. In addition, the sensor portions 221 to 226 respectively include torque sensors 541 to 546 (see FIG. 4). The torque sensors 541 to 546 detect torques of the joints $J_1$ to $J_6$. That is, the torque sensors 541 to 546 produce signals corresponding to the torques of the joints $J_1$ to $J_6$. In addition, each of the servo motors 201 to 206 includes a reduction gear (not illustrated), which is connected to a frame driven by a corresponding one of the joints $J_1$ to $J_6$. The reduction gear is connected to the frame directly or via a transmission member, such as a belt or a bearing (both not illustrated).

Note that the torque sensors 541 to 546 detect the torque, which serves as driving force, outputted from the electric motors 211 to 216; and the torque, which serves as external force, applied to the first to the sixth links 10 to 15 of the robot arm 251. That is, the torque sensors 541 to 546 serve also as external-force detection sensors. Since the torque sensors 541 to 546 detect the external force applied to the first to the sixth links 10 to 15 of the robot arm 251, the torque sensors 541 to 546 can function also as a contact detection portion that detects that an object (e.g., a person or an object) contacts the first to the sixth links 10 to 15.

In the interior of the robot arm 251, a servo control portion 230 is disposed. The servo control portion 230 serves as a driving-force control portion, and controls the driving force of the electric motors 211 to 216 of the servo motors 201 to 206.

The servo control portion 230 receives torque command values for the joints $J_1$ to $J_6$; causes current to flow in the electric motors 211 to 216, depending on the received torque command values, so that the torques of the joints $J_1$ to $J_6$ change in accordance with the torque command values; and thereby controls the driving force of the electric motors 211 to 216. Note that although the description will be made, in the first embodiment, for the case where the servo control portion 230 is a single control apparatus, the servo control portion 230 may be a group of a plurality of control apparatuses corresponding to the electric motors 211 to 216. In addition, although the servo control portion 230 is disposed in the robot arm 251 in the first embodiment, the servo control portion 230 may be disposed in the housing of the control apparatus 300.

The robot arm 251 of the robot 200 also includes a plurality of brakes (e.g., disc brakes) 231 to 236 that respectively brake the joints $J_1$ to $J_6$. By activating the brakes 231 to 236, the joints $J_1$ to $J_6$ can be fixed so as not to move.

Note that the teaching pendant 400 includes a stop button 401, which serves as a stop operation portion that sends a stop command to the control apparatus 300 when operated by an operator.

As illustrated in FIG. 2, in the robot 200, a plurality of contact sensors is disposed in each of the first to the sixth links 10 to 15 of the robot arm 251. Thus, when an object, such as a person or an object, contacts each of the first to the sixth links 10 to 15, a corresponding contact sensor sends a signal to the control apparatus 300. Specifically, two contact sensors 710 are disposed in the first link 10, two contact sensors 711 are disposed in the second link 11, and two contact sensors 712 are disposed in the third link 12. In addition, two contact sensors 713 are disposed in the fourth link 13, two contact sensors 714 are disposed in the fifth link 14, and two contact sensors 715 are disposed in the sixth link 15. Furthermore, two contact sensors 716 are disposed in a distal-end flange 16, which serves as a connection portion to which the hand tool 252 is attached. That is, basically in each of the links, a plurality of contact sensors is disposed at a plurality of (at least two) positions (that is, at two or more positions).

Note that each of the contact sensors may be a contact sensor, such as a resistive-film sensor or a capacitance sensor, or may be a non-contact sensor, such as an ultrasonic-wave sensor, an optical (infrared) sensor, or an electromagnetic-induction sensor. In another case, each of the contact sensors may be a force sensor, such as a piezoelectric-element sensor or a strain gauge. Among these sensors, if a sensor used can output a signal corresponding to an external force, the sensor may have not only a function to detect the contact of an object, but also a function to detect the external force. In addition, since the arrangement of the contact sensors is one example, the contact sensors may be arranged differently. In addition, the contact of an object to each of the first to the sixth links 10 to 15 may be detected by estimating the external force by using signals from the above-described sensor portions 221 to 226, which detect the torque of the joints $J_1$ to $J_6$ as described above. In another case, the robot 200 may include hand guides attached to predetermined portions of the robot arm 251, and sensors that detect the external force applied to the hand guides. In this case, since the external force is applied to the hand guides, the external force will be applied to limited portions of the robot arm 251.

Configuration of Control Apparatus

Figure 3:
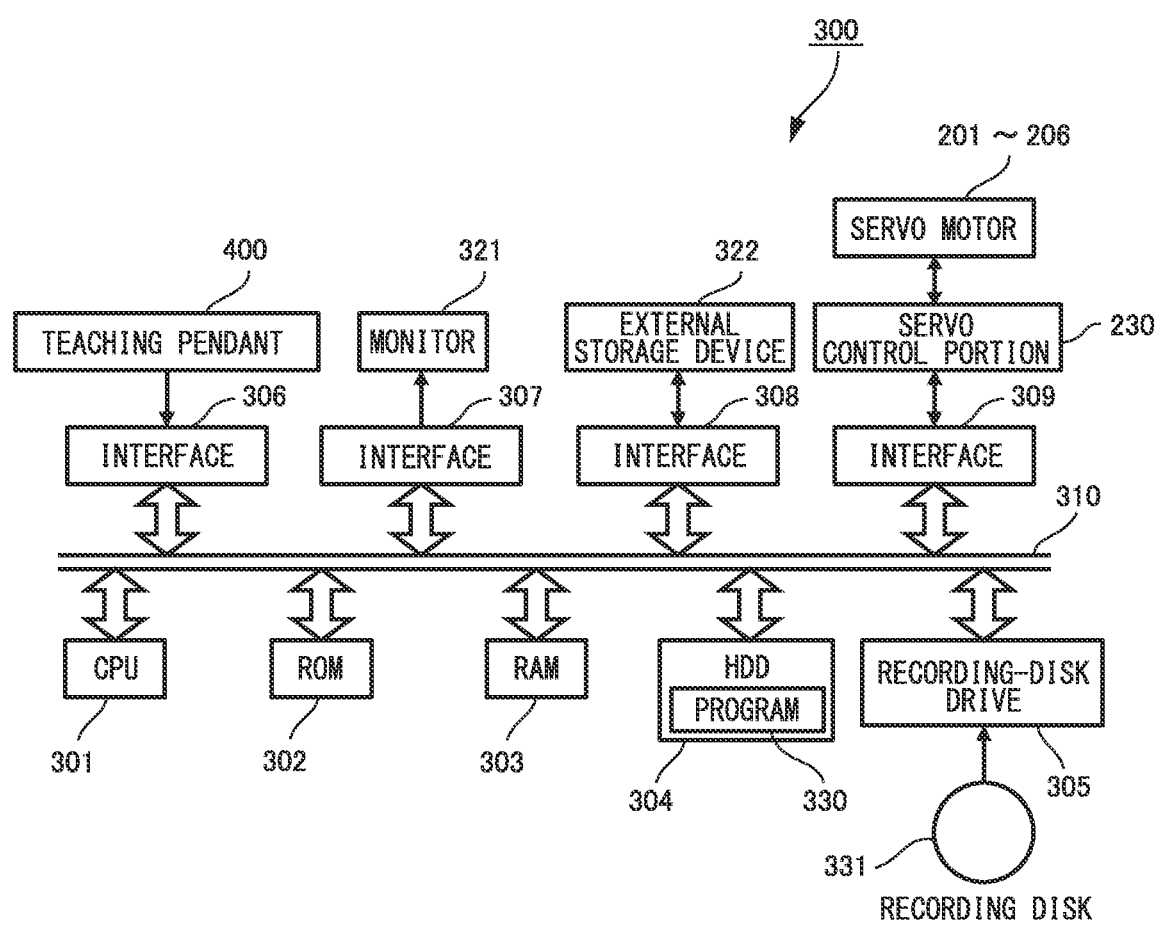
FIG. 3 is a block diagram illustrating a control apparatus of the robot system of the first embodiment.

Next, the control apparatus 300 that controls the robot 200 will be described with reference to FIG. 3. FIG. 3 is a block diagram illustrating a control apparatus of a robot system of the first embodiment. The control apparatus 300 is a computer, and includes a central processing unit (CPU) 301 that serves as a processing portion. In addition, the control apparatus 300 includes a read only memory (ROM) 302, a random-access memory (RAM) 303, and a hard disk drive (HDD) 304, which serve as storage portions. In addition, the control apparatus 300 also includes a recording-disk drive 305 and various interfaces 306 to 309.

The CPU 301 is connected with the ROM 302, the RAM 303, the HDD 304, the recording-disk drive 305, and the various interfaces 306 to 309, via a bus 310. The ROM 302 stores a base program such as a BIOS. The RAM 303 is a storage device that temporarily stores various types of data, such as results of a computing process performed by the CPU 301.

The HDD 304 is a storage device that stores results of a computing process performed by the CPU 301 and various types of data obtained from an external device; and stores a program 330 that causes the CPU 301 to execute a below-described computing process. The CPU 301 performs each process of a robot control method, depending on the program 330 recorded (stored) in the HDD 304.

The recording-disk drive 305 reads various types of data and a program stored in a recording disk 331.

The teaching pendant 400 is connected to the interface 306. The CPU 301 receives teach data from the teaching pendant 400, via the interface 306 and the bus 310.

The servo control portion 230 is connected to the interface 309. The CPU 301 obtains signals from the sensor portions 221 to 226, via the servo control portion 230, the interface 309, and the bus 310. In addition, the CPU 301 outputs torque-command-value data for each joint, to the servo control portion 230, via the bus 310 and the interface 309, at predetermined time intervals.

The interface 307 is connected with a monitor 321, which displays various images under the control performed by the CPU 301. The interface 308 can be connected with an external storage device 322, such as a rewritable nonvolatile memory or an external HDD. The external storage device 322 is a storage portion.

In the first embodiment, the description will be made for a case where the HDD 304 is a computer-readable recording medium and stores the program 330. However, the present disclosure is not limited to this. The program 330 may be recorded in any recording medium as long as the recording medium is a computer-readable recording medium. For example, the ROM 302, the recording disk 331, or the external storage device 322, which are illustrated in FIG. 3, may be used as the recording medium that can provide the program 330. Specifically, a flexible disk, a hard disk, an optical disk, a magneto-optical disk, a DVD-ROM, a CD-ROM, a CD-R, a magnetic tape, a nonvolatile memory, an HDD, a ROM, or the like may be used as the recording medium.

Although not illustrated in FIG. 3, the above-described contact sensors 710 to 715, and below-described angle sensors 551 to 556 and torque sensors 541 to 546 of the sensor portions 221 to 226 are connected to the bus 310 via interfaces.

Control System of Robot System

Figure 4:
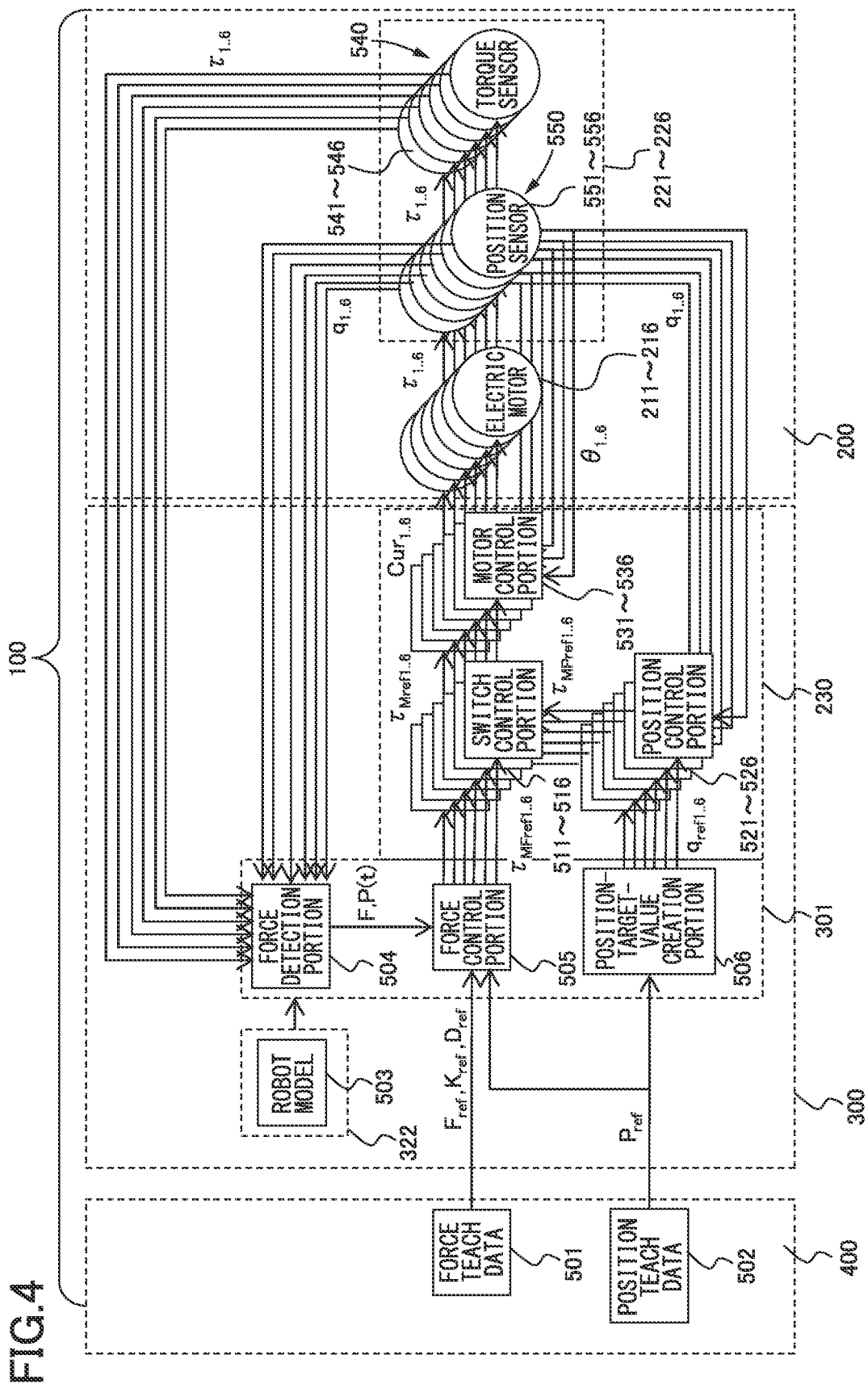
FIG. 4 is a control block diagram illustrating a control system of the robot system of the first embodiment.

Next, a control system of the robot system of the first embodiment will be described with reference to FIG. 4. FIG. 4 is a control block diagram illustrating the control system of the robot system of the first embodiment. The CPU 301 of the control apparatus 300 functions as a force detection portion 504, a force control portion 505, and a position-target-value creation portion 506 by executing the program 330. The servo control portion 230 functions as a plurality of (six because the robot arm has six joints) switch control portions 511 to 516, a plurality of (six because the robot arm has six joints) position control portions 521 to 526, and a plurality of (six because the robot arm has six joints) motor control portions 531 to 536.

The sensor portions 221 to 226 respectively include the angle sensors (position sensors) 551 to 556, and the torque sensors 541 to 546. The angle sensors 551 to 556 are rotary encoders (encoders). The angle sensors (position sensors) 551 to 556 detect angles (positions) of the electric motors 211 to 216 or the joints $J_1$ to $J_6$. That is, the angle sensors (position sensors) 551 to 556 produce signals corresponding to the angles (positions).

In the first embodiment, the angle sensors 551 to 556 directly detect angles $\theta_1$ to $\theta_6$ of the electric motors 211 to 216. Note that angles $q_1$ to $q_6$ of the joints $J_1$ to $J_6$ can be calculated from the angles $\theta_1$ to $\theta_6$ by using a reduction ratio of a reduction gear (not illustrated). Thus, the angle sensors 551 to 556 indirectly detect the angles $q_1$ to $q_6$ of the joints $J_1$ to $J_6$.

The torque sensors 541 to 546 detect torques $\tau_1$ to $\tau_6$ of the joints $J_1$ to $J_6$, respectively. That is, the torque sensors 541 to 546 produce signals corresponding to the torques. The plurality of angle sensors 551 to 556 constitute a position detection portion 550. The position detection portion 550 is a sensor that detects the position (and posture) P of the hand of the robot 200. That is, the position detection portion 550 is a sensor that produces a signal corresponding to the position P of the hand of the robot 200. In addition, the plurality of torque sensors 541 to 546 constitute a force detection portion 540. The force detection portion 540 is a sensor that detects a force (hand force) F applied to the hand of the robot 200. That is, the force detection portion 540 is a sensor that produces a signal corresponding to the force F.

The teaching pendant 400 is operated by an operator; and outputs a force target value $F_{ref}$ contained in the force teach data 501 and a position target value $P_{ref}$ contained in the position teach data 502, to the CPU 301. The force target value $F_{ref}$ is a target value of the hand force of the robot 200, and is set by an operator by using the teaching pendant 400. The position target value $P_{ref}$ is a target value of the hand position of the robot 200, and is set by an operator by using the teaching pendant 400. The external storage device 322 stores a robot model 503.

If the stop button 401 is operated by an operator, the teaching pendant 400 outputs a stop command to the force control portion 505 of the CPU 301.

The force detection portion 504 uses signals corresponding to the torques $\tau_1$ to $\tau_6$ obtained from the torque sensors 541 to 546, and signals corresponding to the angles $q_1$ to $q_6$ obtained from the angle sensors 551 to 556; and calculates a current position P(t) of the hand of the robot 200 and a hand force F of the robot 200 obtained when the hand is located at the current position P(t). The force detection portion 504 calculates the current position P(t) of the hand of the robot 200 by using signals corresponding to the angles $q_1$ to $q_6$ obtained from the angle sensors 551 to 556. Note that the force detection portion 504 may calculate the hand force F of the robot 200 by using a force sensor (not illustrated) attached to the hand of the robot 200.

The force control portion 505 receives signals representing the robot model 503 (virtual mass $M_{ref}$), the force target value $F_{ref}$, the position target value $P_{ref}$, a stiffness coefficient (spring coefficient) $K_{ref}$, a viscosity coefficient (damper coefficient) $D_{ref}$, the current position P(t), and the force F. Then the force control portion 505 uses these values, and calculates torque command values $\tau_{MFref1}$ to $\tau_{MFref6}$ for the joints $J_1$ to $J_6$. Specifically, the force control portion 505 calculates the torque command values $\tau_{MFref1}$ to $\tau_{MFref6}$ such that the force deviation between the hand force F and the force target value $F_{ref}$, the position deviation between the position P(t) of the hand and the position target value $P_{ref}$, and the velocity deviation between a velocity P(t)(dot) of the hand and a velocity target value $P_{ref}$(dot) are made smaller. The force control portion 505 outputs the calculated torque command values $\tau_{MFref1}$ to $\tau_{MFref6}$ to the switch control portions 511 to 516, respectively. Note that the velocity P(t)(dot) is obtained by differentiating the position P(t) with respect to time, and the velocity target value $P_{ref}$(dot) is obtained by differentiating the position target value $P_{ref}$ with respect to time. Thus, in the first embodiment, the force control portion 505 calculates the velocity P(t)(dot) of the hand, from the position P(t) of the hand detected by the position detection portion 550. Note that the position detection portion 550 may calculate the velocity P(t) (dot) of the hand, and output the data of the velocity P(t)(dot). In this case, the position detection portion 550 serves also as a velocity detection portion that detects the velocity of the hand. That is, the position detection portion 550 serves also as a sensor that produces a signal corresponding to the velocity of the hand. Note that the symbol "(dot)" means to calculate a first derivative with respect to time.

The position-target-value creation portion 506 calculates angle command values (position command values) $q_{ref1}$ to $q_{ref6}$ for the joints $J_1$ to $J_6$, from the position target value $P_{ref}$ through calculation based on inverse kinematics; and outputs the angle command values $q_{ref1}$ to $q_{ref6}$ to the position control portions 521 to 526, respectively.

The position control portions 521 to 526 calculate torque command values $\tau_{MPref1}$ to $\tau_{MPref6}$ such that the angle deviation between the angles $q_1$ to $q_6$ of the joints $J_1$ to $J_6$ and the angle command values $q_{ref1}$ to $q_{ref6}$ for the joints $J_1$ to $J_6$ is made smaller. Note that decreasing the angle deviation is equal to decreasing the angle deviation between the angles of the electric motors 211 to 216 and angle command values into which the angle command values $q_{ref1}$ to $q_{ref6}$ are converted by using, for example, a reduction ratio of the reduction gear. The position control portions 521 to 526 outputs the torque command values $\tau_{MPref1}$ to $\tau_{MPref6}$ to the switch control portions 511 to 516, respectively.

The switch control portions 511 to 516 switch the mode between a force control mode for performing torque-based force control and a position control mode for performing position control. In the force control mode, the switch control portions 511 to 516 output the torque command values $\tau_{MFref1}$ to $\tau_{MFref6}$ to the motor control portions 531 to 536, as torque command values $\tau_{Mref1}$ to $\tau_{Mref6}$. In the position control mode, the switch control portions 511 to 516 output the torque command values $\tau_{MPref1}$ to $\tau_{MPref6}$ to the motor control portions 531 to 536, as the torque command values $\tau_{Mref1}$ to $\tau_{Mref6}$.

The motor control portions 531 to 536 cause currents $Cur_1$ to $Cur_6$ to flow in the electric motors 211 to 216 for achieving the torque command values $\tau_{Mref1}$ to $\tau_{Mref6}$, depending on the angles (positions) $\theta_1$ to $\theta_6$ of the electric motors 211 to 216.

Force Control of Robot

Figure 5:
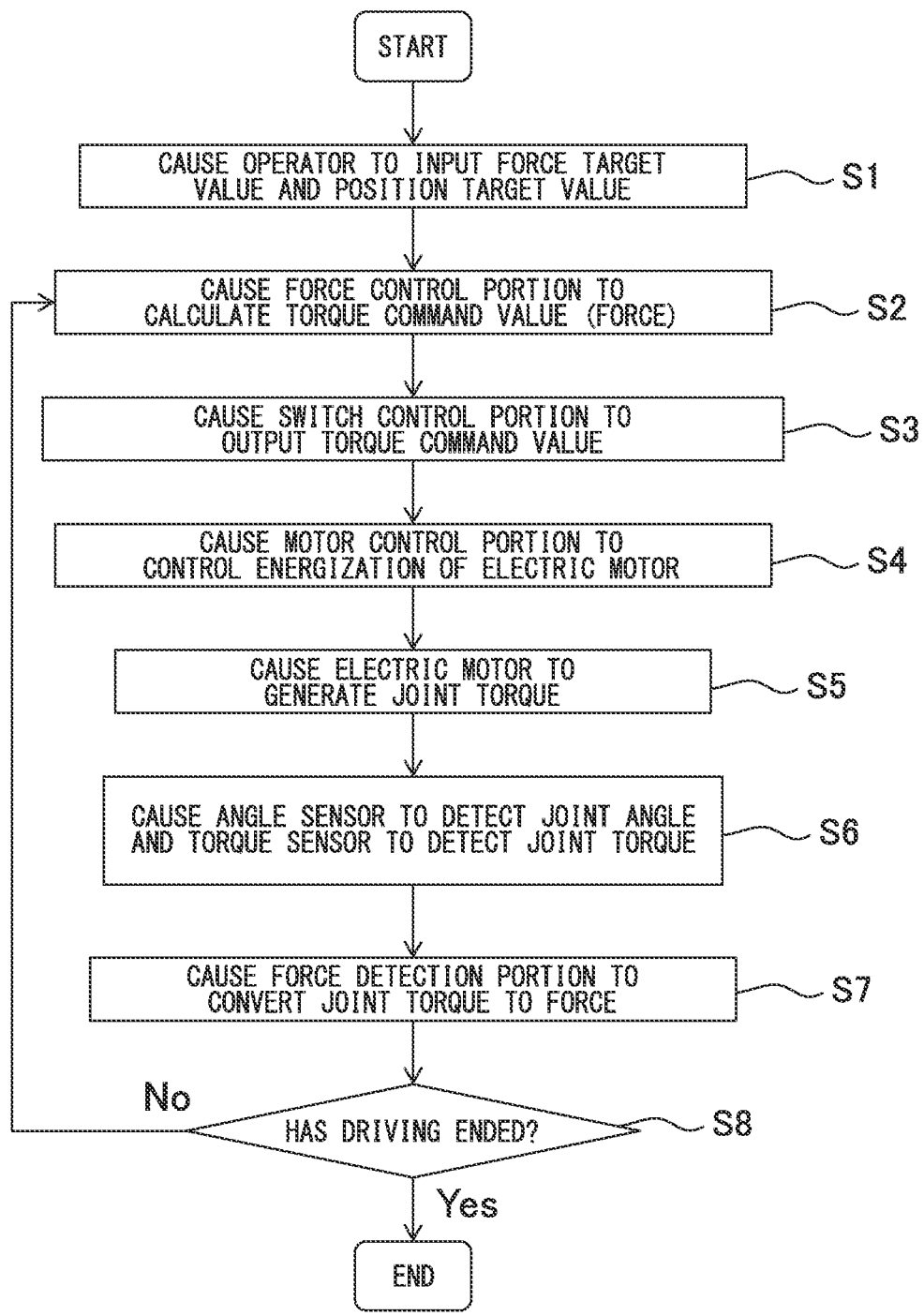
FIG. 5 is a flowchart for performing force control on the robot arm in the first embodiment.

Next, a method of performing the force control on the robot 200 will be described. FIG. 5 is a flowchart for performing the force control on the robot 200 in the first embodiment.

First, an operator inputs the force target value $F_{ref}$ and the position target value $P_{ref}$ into the teaching pendant 400 (S1). The force target value $F_{ref}$ is included in the force teach data 501, and the position target value $P_{ref}$ is included in the position teach data 502. The position target value $P_{ref}$ represents a position at which the force control operation is started.

The force control portion 505 uses the robot model 503 and calculates the torque command values (force) $\tau_{MFref1}$ to $\tau_{MFref6}$ for the electric motors 211 to 216 such that the hand force F follows the force target value $F_{ref}$ (S2). That is, the force control portion 505 uses the robot model 503, and calculates the torque command values (force) $\tau_{MFref1}$ to $\tau_{MFref6}$ for the electric motors 211 to 216 such that the deviation between the hand force F and the force target value $F_{ref}$ is made smaller.

The switch control portions 511 to 516 output the torque command values (force) $\tau_{MFref1}$ to $\tau_{MFref6}$ to the motor control portions 531 to 536, as the torque command values $\tau_{Mref1}$ to $\tau_{Mref6}$ (S3).

The motor control portions 531 to 536 control the energization of the electric motors 211 to 216 for achieving the torque command values $\tau_{Mref1}$ to $\tau_{Mref6}$, depending on the angles $\theta_1$ to $\theta_6$ of the electric motors 211 to 216 (S4).

When energized, the electric motors 211 to 216 generate joint torques $\tau_1$ to $\tau_6$ (S5).

The angle sensors 551 to 556 detect the angles $q_1$ to $q_6$ of the joints $J_1$ to $J_6$ (the angles $\theta_1$ to $\theta_6$ of the electric motors 211 to 216). The torque sensors 541 to 546 detect the torques $\tau_1$ to $\tau_6$ of the joints $J_1$ to $J_6$ (S6). The angles $q_1$ to $q_6$ of the joints $J_1$ to $J_6$ and the torques $\tau_1$ to $\tau_6$ of the joints $J_1$ to $J_6$ are fed back to the CPU 301 of the control apparatus 300.

Based on the robot model 503 and the angles $q_1$ to $q_6$ of the joints $J_1$ to $J_6$, the force detection portion 504 (CPU 301) converts the torques $\tau_1$ to $\tau_6$ of the joints $J_1$ to $J_6$, into the hand force F applied to the hand of the robot 200 at the current position P(t) (S7). Note that the angles $\theta_1$ to $\theta_6$ of the electric motors 211 to 216 may be used instead of the angles $q_1$ to $q_6$ of the joints $J_1$ to $J_6$.

The CPU 301 then determines whether the driving has been completed (S8), and repeats the steps S2 to S7 if the driving has not been completed (S8: No). By driving the electric motors 211 to 216 in accordance with the above-described flow, the force F applied to the hand of the robot 200 can be controlled so that the force F becomes equal to the force target value $F_{ref}$. Note that the force control may not be performed in the order of the flowchart illustrated in FIG. 4, and may be performed in another order.

Position Control of Robot

Figure 6:
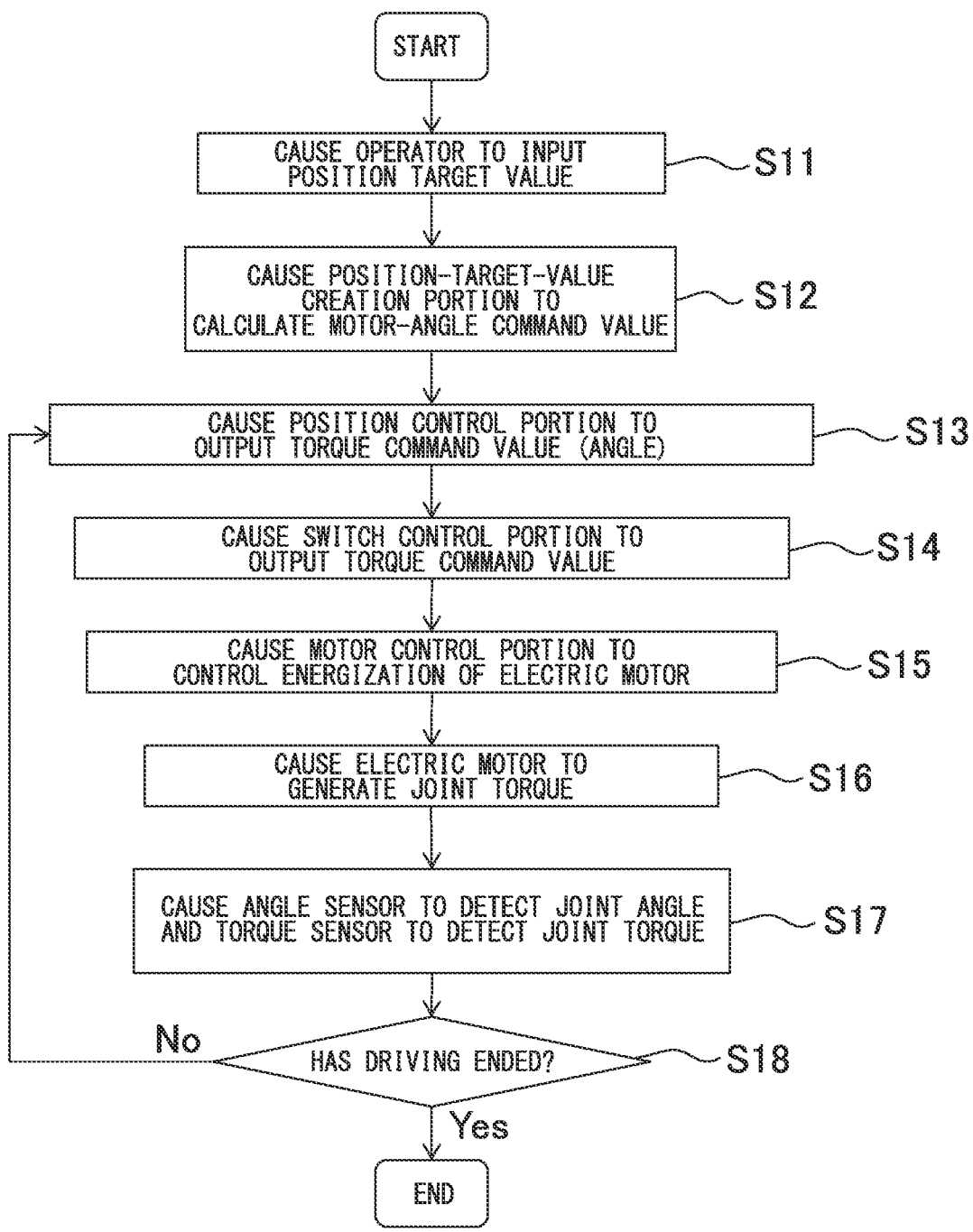
FIG. 6 is a flowchart for performing position control on the robot arm in the first embodiment.

Next, a method of performing the position control on the robot 200 will be described. FIG. 6 is a flowchart for performing the position control on the robot 200 in the first embodiment.

First, an operator inputs the position target value $P_{ref}$ into the teaching pendant 400 (S11). The position target value $P_{ref}$ is included in the position teach data 502.

Based on the robot model 503, the position-target-value creation portion 506 converts the position target value $P_{ref}$ into the angle command values $q_{ref1}$ to $q_{ref6}$ for the joints $J_1$ to $J_6$ (S12).

The position control portions 521 to 526 calculate the torque command values (angles) $\tau_{MPref1}$ to $\tau_{MPref6}$ for the electric motors 211 to 216 such that the angles $q_1$ to $q_6$ of the joints $J_1$ to $J_6$ follow the angle command values $q_{ref1}$ to $q_{ref6}$ for the joints $J_1$ to $J_6$ (S13). Note that the angles $\theta_1$ to $\theta_6$ of the electric motors 211 to 216 may be used instead of the angles $q_1$ to $q_6$, as signals representing the angles of the joints $J_1$ to $J_6$.

The switch control portions 511 to 516 output the torque command values (angles) $\tau_{MPref1}$ to $\tau_{MPref6}$ to the motor control portions 531 to 536, as the torque command values $\tau_{Mref1}$ to $\tau_{Mref6}$ (S14).

Note that since the steps S15, S16, S17, and S18 are the same as the steps S4, S5, S6, and S8, the description thereof will be omitted. By driving the electric motors 211 to 216 in accordance with the above-described flow, the hand position P of the robot 200 can be controlled so that the hand position P follows the desired position target value $P_{ref}$.

The force control performed in the steps S1 to S8, and the position control performed in the steps S11 to S18 are switched by the switch control portions 511 to 516, so that one of the force control and the position control is selected in accordance with the work to be performed.

Direct Teach Mode of Robot

Figure 7:
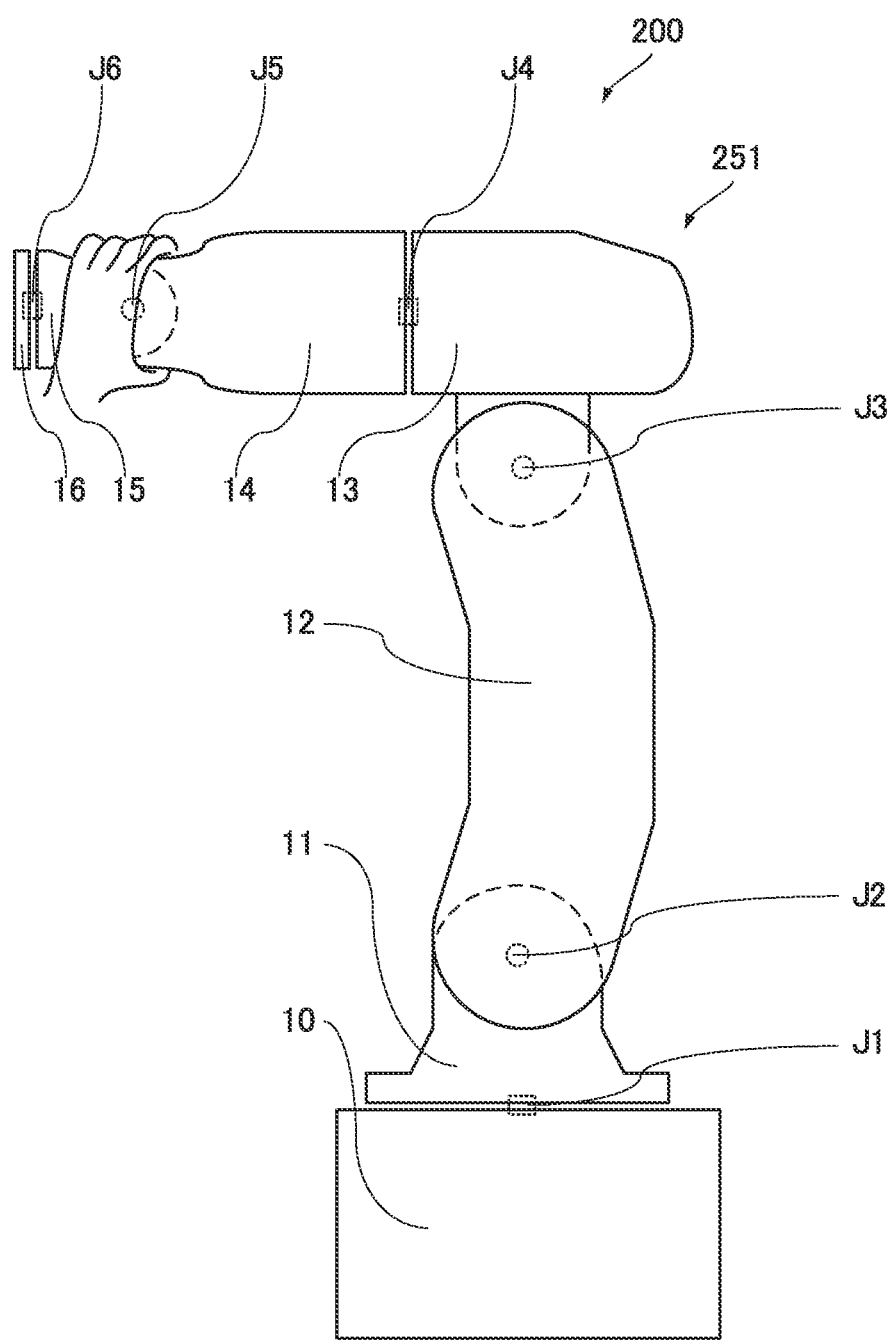
FIG. 7 is a schematic diagram illustrating one example of a state where the robot arm is held with one hand and operated.
Figure 8:
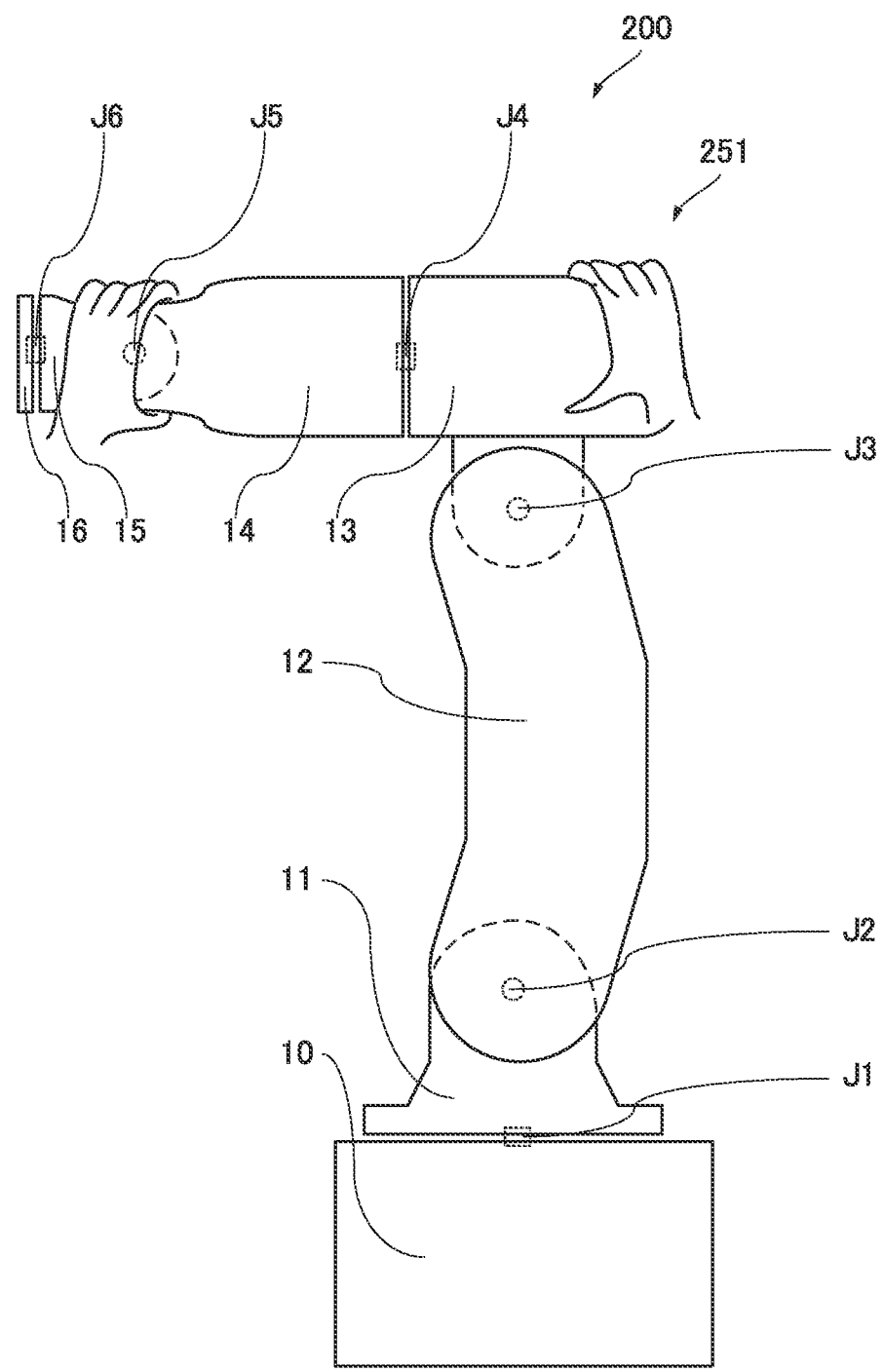
FIG. 8 is a schematic diagram illustrating one example of a state where the robot arm is held with both hands and operated.
Figure 9A:
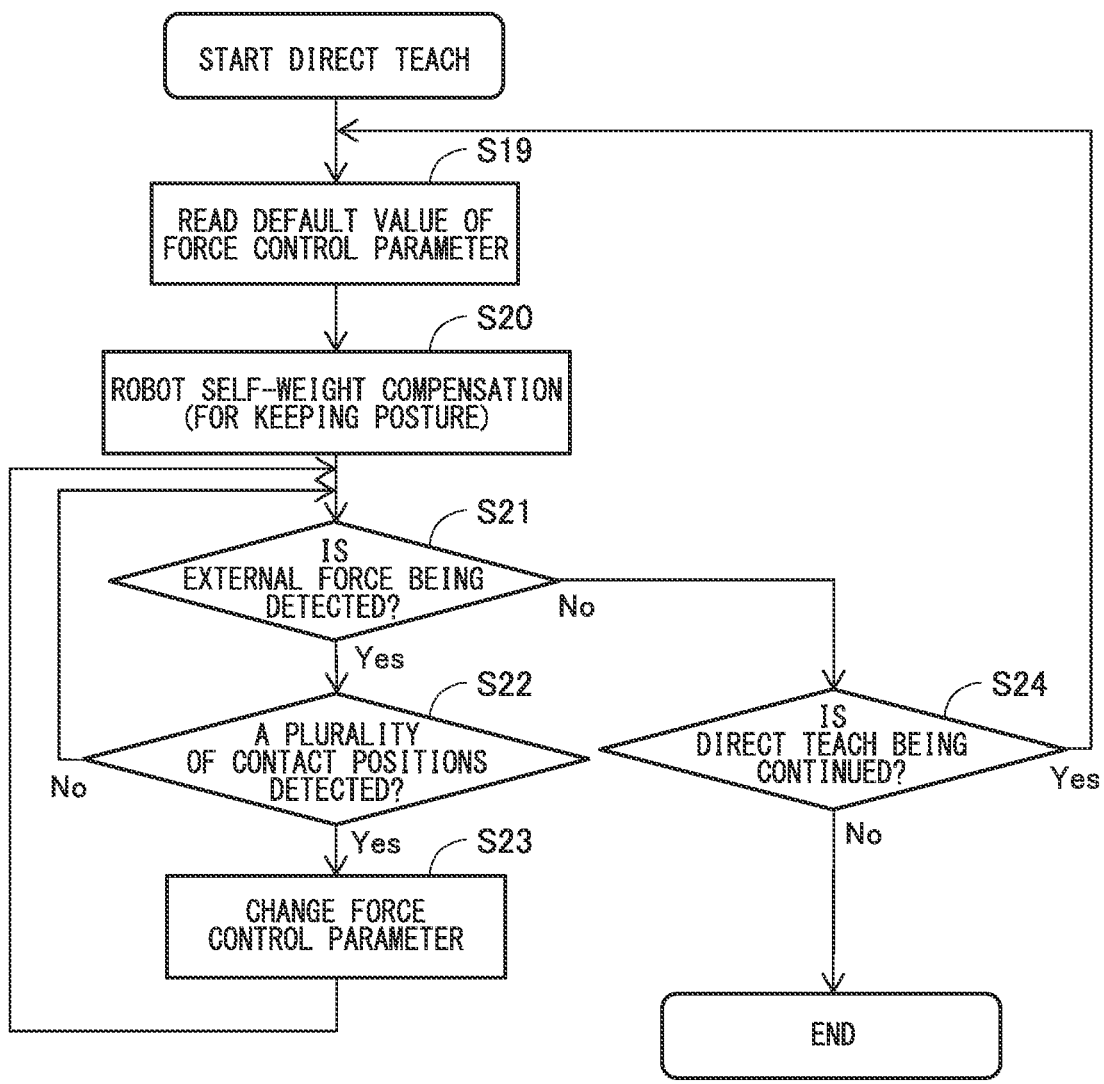
FIG. 9A is a flowchart for performing the control in a direct teach mode, by detecting a contact position by using contact sensors of the first embodiment.
Figure 9B:
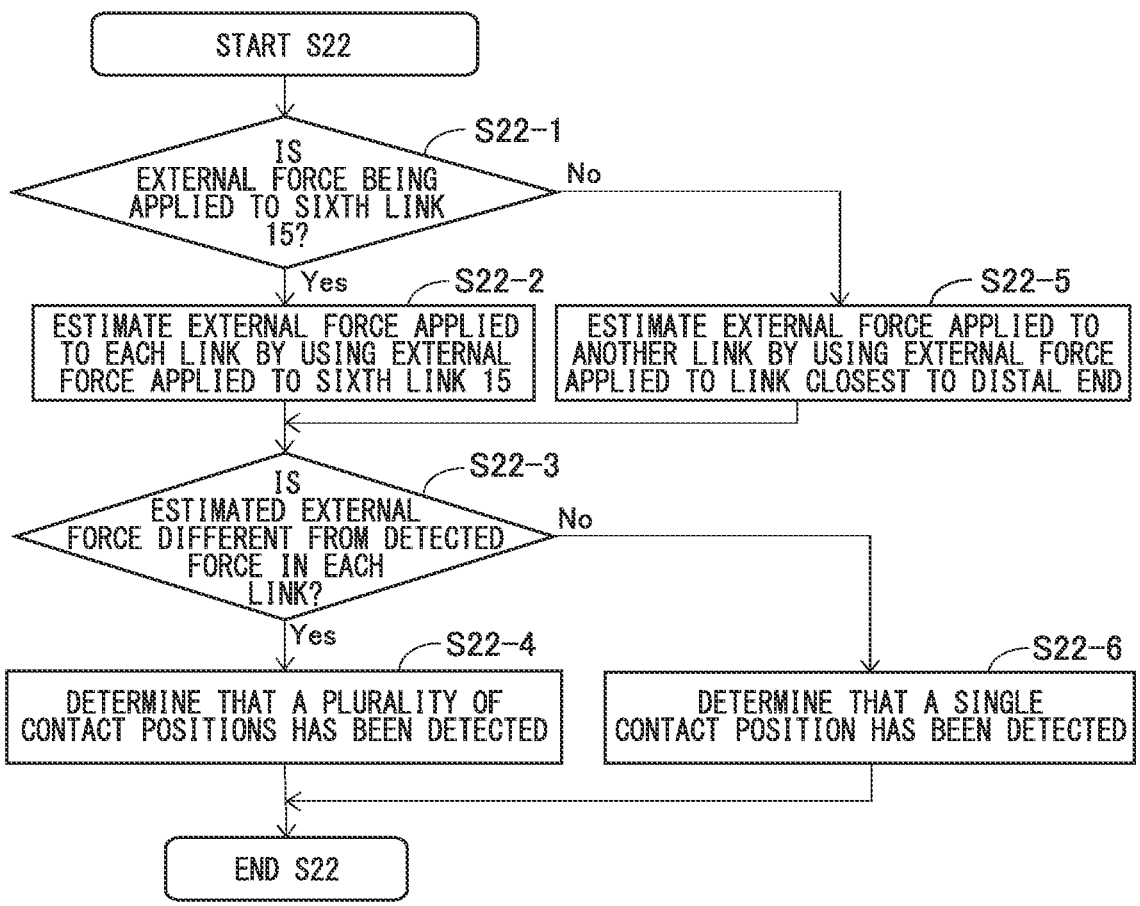
FIG. 9B is a flowchart for performing the control in a direct teach mode, by detecting a contact position by using torque sensors of the first embodiment.

Next, the direct teach will be described with reference to FIGS. 7 to 9B. In the direct teach, an operator teaches the robot 200 a trajectory by operating the robot 200 with his/her hand (human hand). FIG. 7 is a schematic diagram illustrating one example of a state where the robot arm is held with one hand and operated. FIG. 8 is a schematic diagram illustrating a state where the robot arm is held with both hands and operated. FIGS. 9A and 9B are flowcharts illustrating the control performed in a direct teach mode of the first embodiment. FIG. 9A is a diagram illustrating a flow for obtaining an information of a contact position by using the contact sensors 710 to 716. FIG. 9B is a diagram illustrating a flow for obtaining an information of a contact position by using the torque sensors 541 to 546.

The control apparatus 300 of the robot system 100 of the first embodiment teaches the robot system 100 a trajectory by actually moving the robot arm 251 when the robot system 100 is installed in a production line of a factory, for example. Then, the robot system 100 manufactures products by moving the robot arm 251 along the trajectory that has been taught (manufacturing process). For example, a predetermined workpiece and another workpiece are prepared as materials, and the predetermined workpiece is assembled to the other workpiece by the robot system 100, so that an assembled workpiece can be manufactured as a product. In this manner, products can be manufactured by the robot arm 251. Note that although the description has been made, as an example, in the present embodiment for the case where a product is manufactured by the robot arm 251 assembling one workpiece to another workpiece, the present disclosure is not limited to this. For example, products may be manufactured by attaching a tool, such as a cutting tool or a grinding tool, to the robot arm 251, and causing the tool to machine a workpiece.

For teaching the robot, a common teaching mode or a direct teach mode (direct teaching mode) can be performed. In the common teaching mode, an operator teaches the robot a trajectory by moving the robot arm 251 by using the teaching pendant 400, and causes the robot system 100 to store the trajectory data. In the direct teach mode, an operator teaches the robot a trajectory by moving the robot arm 251 with his/her hand (human hand), and causes the robot system 100 to store the trajectory data. Hereinafter, the direct teach mode performed by the control apparatus 300 will be described in detail.

In the direct teach mode performed by the control apparatus 300, a person who serves as a teacher operates (moves) the robot arm 251 with one hand as illustrated in FIG. 7, or with both hands as illustrated in FIG. 8. A person often moves the robot arm 251 with one hand for roughly operating (moving) the robot arm 251, and with both hands for precisely operating the robot arm 251.

In addition, in the direct teach mode (hereinafter referred to simply as direct teach), the control apparatus 300 performs the above-described force control on the robot. In this case, a force target value is set. In the conventional technique, however, the force target value is merely set in consideration of the strength and the direction of the force applied. If the robot arm is operated with a human hand, force is produced and detected. The force target value produced in accordance with the force is determined by parameters (hereinafter referred to as force control parameters) of force control, which are set in advance. Thus, regardless of which of one hand and both hands the robot arm is operated with, the same force target value is produced if the force produced by the operation with a human hand (or human hands) is the same, and if the force control parameters are not changed. In addition, in the conventional technique, since changing the force control parameters during the direct teach takes much time, the force control is performed without changing the force control parameters while the robot arm is being operated.

However, in terms of the operability of the robot arm 251, if is preferable that the robot arm 251 be moved significantly by weak force if an operator desires to roughly operate the robot arm 251, and that the robot arm 251 be moved slightly even by strong force if an operator desires to precisely operate the robot arm 251. Thus, in the first embodiment, the below-described control is performed as illustrated in FIGS. 9A and 9B. Specifically, if the external force is detected at one position, the position and posture of the robot is made easy to change; if the external force is detected at a plurality of positions, the position and posture of the robot is made difficult to change.

In the first embodiment, impedance control is performed, as one example, for changing the operability of the direct teach. The impedance control is one type of force control. Specifically, the impedance control is performed on the assumption that a virtual spring and a virtual damper exist between a hand position (current position) of the robot 200 and a target position. Thus, the impedance control moves the hand of the robot 200 on the assumption that the force based on the strength of the spring and the damper is applied to the hand of the robot 200.

The force target value (applied to the hand of the robot) F is expressed by the following equation:

$$D(\dot{x}-\dot{x}_d)+K(x-x_d)=F$$

where D is a damper coefficient, K is a spring coefficient, x is a current position, and $x_d$ is a target position (i.e., a supporting point of the spring).

In the direct teach, the target position $x_d$ is set in accordance with the level of force applied by an operation of a person, and the force target value F is determined in accordance with the damper coefficient D and the spring coefficient K. In short, in the first embodiment, the force control parameters are the damper coefficient D and the spring coefficient K used in the impedance control. However, the use of the damper coefficient D and the spring coefficient K as force control parameters, as in the first embodiment, is one example; and the force control parameters are not limited to the damper coefficient D and the spring coefficient K.

Next, the control performed in the direct teach of the first embodiment will be described with reference to FIG. 9A. If the direct teach is started by, the control apparatus 300, the CPU 301 reads default values of various force-control parameters (S19). Note that the default values of various parameters, read in S19, are set in advance by a user.

Then the CPU 301 obtains angles (positions) of the joints $J_1$ to $J_6$ detected by the angle sensors 551 to 556, and calculates a posture of the robot arm 251. In addition, the CPU 301 calculates torques applied to the joints to $J_1$ to $J_6$ by the self weight of the robot arm 251. Specifically, the CPU 301 calculates the torques by using pre-stored mechanical-model information (the mechanical model includes a model of the end effector attached to the distal end of the robot). Then, for keeping the posture of the robot arm 251, the CPU 301 performs servo control to cancel the calculated torques applied to the joints $J_1$ to $J_6$. That is, the CPU 301 causes the electric motors 211 to 216 to output (calculated) torques to the joints $J_1$ to $J_6$ (S20).

That is, if the torque sensors 541 to 546, disposed in the joints $J_1$ to $J_6$ of the robot 200 are used in the direct teach as sensors that detect the external force, since the torque sensors 541 to 546 are applied with the self weight of the robot 200 even when the robot 200 is not held and operated by a person, the torque sensors 541 to 546 detect the force. Thus, if the position and posture of the robot 200 is changed by the detected force (i.e., the self weight of the robot 200) even though the robot 200 is not operated by a person, it will be against the intention of the operator. For this reason, the self weight compensation is performed in Step S20 for preventing such a problem.

Then, the CPU 301 detects the external force applied to the first to the sixth links 10 to 15 or the distal-end flange 16 (that is, an operation performed by a person), depending on the detection results from the torque sensors 541 to 546 of the joints $J_1$ to $J_6$ (S21). If the external force is not detected (S21: No), then the CPU 301 checks whether the direct teach is being continued (S24). If the direct teach is being continued (S24: Yes), then the CPU 301 returns to Step S19. Note that the external force applied to the first to the sixth links 10 to 16 may not be detected by using the torque sensors 541 to 546. For example, if the above-described contact sensors 710 to 716 can detect the external force, the external force may be detected by using the contact sensors 710 to 716.

If the external force applied to the first to the sixth links 10 to 15 or the distal-end flange 16 (that is, an operation performed by a person) is detected (S21: Yes), then the CPU 301 determines whether a person is contacting the robot at a plurality of positions, depending on the contact detection results from the contact sensors 710 to 716 (S22). That is, the CPU 301 determines which of one hand and both hands a person is contacting the robot with. If it is determined that a person is contacting the robot at a single position, that is, if the person is holding the robot with one hand (S22: No), then the CPU 301 directly returns to Step S21.

Note that if the robot arm 251 is held with one hand and operated, the CPU 301 controls the motor control portions 531 to 536 by using default force-control parameters. That is, the CPU 301 performs the force control on the electric motors 211 to 216 of the joints $J_1$ to $J_6$, and sets the resistance value of each of the joints $J_1$ to $J_6$ so that the resistance value is a first resistance value produced in accordance with the default damper coefficient D and the default spring coefficient K (first resistance control). In addition, also in a period of time in which the robot arm 251 is operated with one hand, positions of the robot arm 251 (the first to the sixth links 10 to 15) and the hand tool 252 are detected by the angle sensors (position sensors) 551 to 556 of the joints $J_1$ to $J_6$. The control apparatus 300 stores a trajectory of the robot 200, produced from the positional detection results (a first teaching process).

If it is detected that a person is contacting a robot at a plurality of (two) positions, that is, if the person is holding the robot with both hands (S22: Yes), then the CPU 301 changes the above-described damper coefficient D and the spring coefficient K, which are force control parameters (S23) (second resistance control). In this case, the resistance value of each of the joints $J_1$ to $J_6$ is increased by changing the force control parameters. Basically, the joints $J_1$ to $J_6$ are made difficult to move, so that the first to the sixth links 10 to 15 are made difficult to move. For making the joints difficult to move, the damper coefficient D of the force control parameters of the above-described impedance control is increased. Note that the spring coefficient K can also be increased for making the joints difficult to move. However, if the spring coefficient K is increased, the force that urges the joints to return to original positions is also increased. For this reason, the spring coefficient K is not significantly increased in the direct teach. Thus, in the present embodiment, the damper coefficient D is set larger when the robot arm is operated with both hands, than the damper coefficient D that is set when the robot arm is operated with one hand. With this operation, the operability in consideration of a user's intension can be achieved. In short, in this case, the joints $J_1$ to $J_6$ of the robot arm 251 are made difficult to move, and can be moved slightly even by strong force.

Note that if the robot arm 251 is held with both hands and operated, the CPU 301 controls the motor control portions 531 to 536 by using force control parameters that have been changed. That is, the CPU 301 performs the force control on the electric motors 211 to 216 of the joints $J_1$ to $J_6$, and sets the resistance value of each of the joints $J_1$ to $J_6$ so that the resistance value is a second resistance value that is larger than the first resistance value, and that is produced in accordance with the damper coefficient D and the spring coefficient K that have been changed from the default values. In addition, also in a period of time in which the robot arm 251 is operated with both hands, positions of the robot arm 251 (the first to the sixth links 10 to 15) and the hand tool 252 are detected by the angle sensors (position sensors) 551 to 556 of the joints $J_1$ to $J_6$. The control apparatus 300 stores a trajectory of the robot 200, produced from the positional detection results (a second teaching process).

If the state where the robot arm is held with both hands is changed to a state where the robot arm is held with one hand (S22: No), then the CPU 301 resets the force control parameters to the default values (although the process is not illustrated in FIG. 9A). If the state where the robot arm is held with both hands and the state where the robot arm is held with one hand are switched to each other repeatedly, the above-described control will be repeated accordingly. If the external force is not detected (S21: No), and a command to end the direct teach is inputted by using the teaching pendant 400 or the like (S24: No), then the CPU 301 ends the direct teach.

In the above description, in Step S22 of FIG. 9A, whether a person is contacting the robot arm at a plurality of positions is determined, based on the contact detection results from the contact sensors 710 to 716, for example. However, the determination may be made by using the torque sensors 541 to 546. Next, Step S22 will be described in detail with reference to FIG. 9B. FIG. 9B is a flowchart for executing Step S22 for determining contact positions by using the torque sensors 541 to 546.

In FIG. 9B, when the CPU 301 starts the determination for contact positions (that is, the CPU 301 starts Step S22), the CPU 301 determines in Step S22-1 whether the external force is being applied to the sixth link 15, depending on an output value from the torque sensor 546. If the external force is being applied to the sixth link 15 (Step S22-1: Yes), then the CPU 301 proceeds to Step S22-2. If the external force is not being applied to the sixth link 15 (Step S22-1: No), then the CPU 301 proceeds to Step S22-5.

In Step S22-2, the CPU 301 estimates the external force applied to the first to the fifth links 10 to 14, based on the external force being applied to the sixth link 15 and on a current posture of the robot arm 251 obtained from the detection results from the position sensors 551 to 556. Specifically, the CPU 301 estimates the external force that would be applied to each link, obtained in a case where the external force is applied to the sixth link 15 alone, based on the external force being applied to the sixth link 15, output values from the position sensors 551 to 556, and link parameters of the robot arm 251. In other words, the CPU 301 estimates the external force that would be detected by the torque sensors 541 to 545.

In Step S22-3, the CPU 301 determines whether the external force estimated in Step S22-2 for each of the first to the fifth links 10 to 14 is different from the external force actually detected by a corresponding one of the torque sensors 541 to 545. If an estimated external force applied to a link is different from an actually detected external force applied to the link (S22-3: Yes), then the CPU 301 determines that the link is being applied with another external force other than the external force being applied to the sixth link 15. In this case, the CPU 301 proceeds to Step S22-4, determines that a person is contacting the robot arm at a plurality of contact positions, and ends Step S22. If an estimated external force applied to any link is not different from an actually detected external force applied to the link, then the CPU 301 determines that the estimated external forces are the same as the detected forces obtained when the external force is applied to the sixth link 15 alone. Thus, in this case, the CPU 301 proceeds to Step S22-6, determines that a person is contacting the robot arm at one (single) contact position, and ends Step S22. Note that the CPU 301 determines whether an estimated external force is different from an actually detected external force, by determining whether the difference between the estimated external force and the actually detected external force exceeds a preset threshold range.

If the external force is not being applied to the sixth link 15, then the CPU 301 determines a link applied with the external force and closest to the distal end (the sixth link 15 and the distal-end flange 16) (S22-5), from among the links to which the external force is being applied, by using the output values from the torque sensors 541 to 545. Then, the CPU 301 estimates the external force that would be applied to other links, obtained in a case where the external force is applied to only the link closest to the distal end, based on the external force being applied to the link closest to the distal end, and a current posture of the robot arm 251 obtained from output values from the position sensors 551 to 556. In other words, the CPU 301 estimates the external force that would be detected by the other torque sensors.

In Step S22-3, the CPU 301 determines whether the external force estimated in Step S22-5 for each of the other links is different from the external force actually detected by a corresponding one of the other torque sensors. Since the following processes are as described above, the description thereof will be omitted.

In summary, the control is performed such that the resistance of the robot 200 applied to an operator (user) for the operator to move the robot 200 is controlled (S23) in accordance with contact positions at which the operator contacts the robot arm (S22), and the contact positions are determined by using signals from the plurality of contact sensors 710 to 716 or the plurality of torque sensors 541 to 546. In other words, the resistance of the robot applied to an operator for the operator to change the posture of the robot is controlled in accordance with (the number of) contact positions at which the operator contacts the robot arm.

Control Performed when Portions Held with Both Hands are Different

Figure 10:
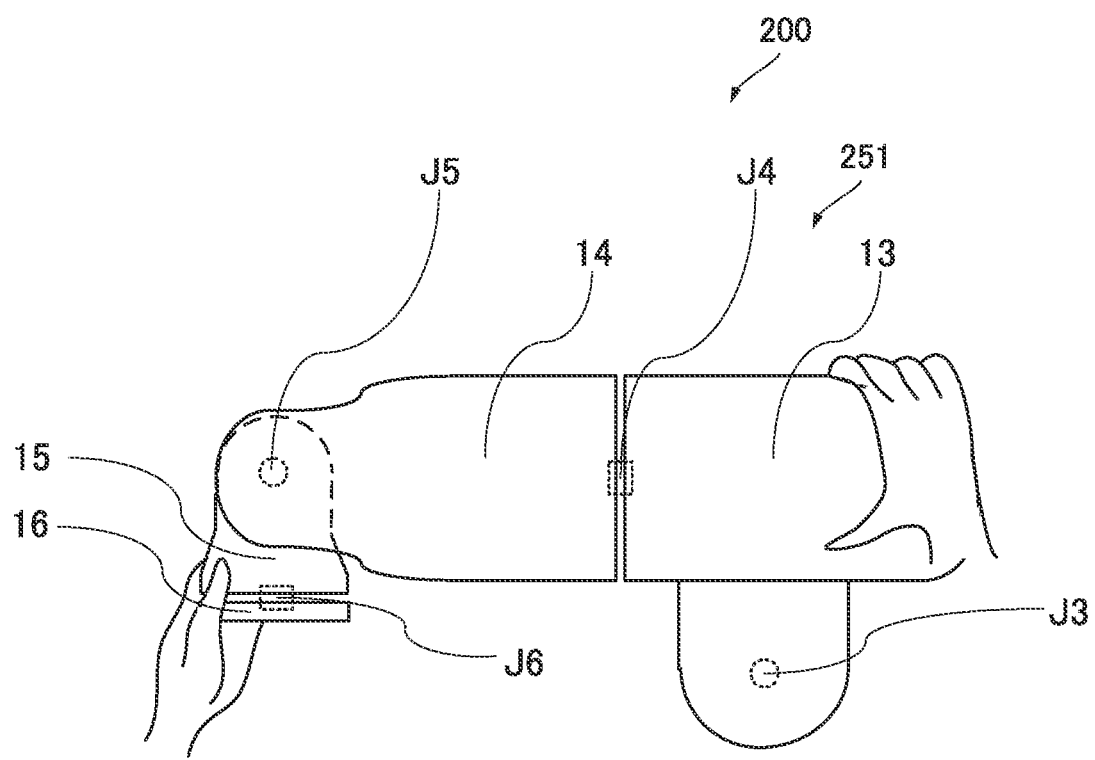
FIG. 10 is a schematic diagram illustrating a state Where a fourth link and a sixth link are held and operated.
Figure 11:
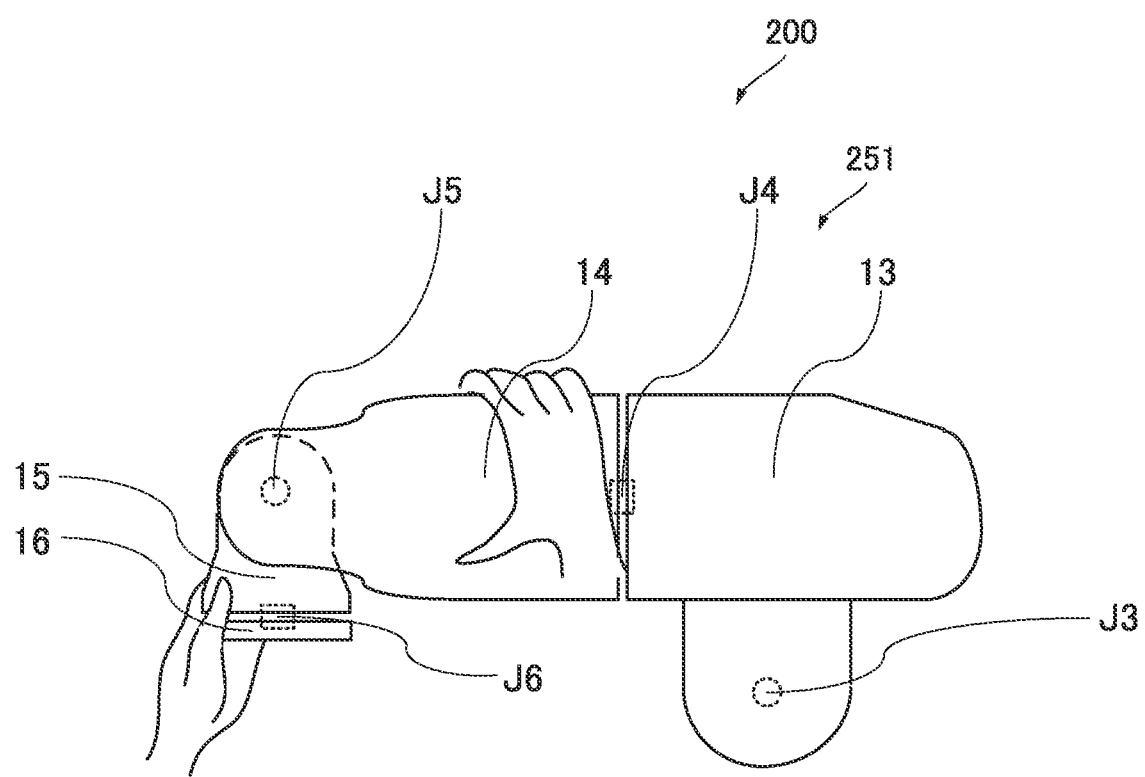
FIG. 11 is a schematic diagram illustrating a state Where a fifth link and the sixth link are held and operated.

Next, the control performed when the external force is detected at different positions will be described with reference to FIGS. 10 and 11. FIG. 10 is a schematic diagram illustrating a state where the fourth link and the sixth link are held and operated. FIG. 11 is a schematic diagram illustrating a state where the fifth link and the sixth link are held and operated.

As illustrated in FIG. 10, when an operator is holding the sixth link 15, the force (hand-side external force) produced by an operator holding and operating the sixth link 15 transmits to the joint $J_1$, which is closest to the base end. In this case, however, since the operator is holding the fourth link 13, the force produced by the operator holding and operating the sixth link 15 is received by the fourth link 13, by the force (base-end-side external force) produced by the operator holding the fourth link 13. As a result, the force produced by the operator holding and operating the sixth link 15 is suppressed from transmitting to the joints $J_1$ to $J_3$, which are nearer to the base end than the fourth link 13 is. In FIG. 11, since an operator is holding the sixth link 15 and the fifth link 14, the force produced by the operator holding and operating the sixth link 15 is received by the fifth link 14. As a result, the force produced by the operator holding and operating the sixth link 15 is suppressed from transmitting to the joints $J_1$ to $J_4$, which are nearer to the base end than the fifth link 14 is.

In such a case, the hand-side external force and the base-end-side external force produced by both hands are detected at two positions. Thus, the degree of ease of moving joints located between the two positions is made different from the degree of ease of moving the other joints, That is, the force control parameters (the damper coefficient D and the spring coefficient K) are set such that the other joints other than the joints located between the two positions at which the external force (contact) is being detected are made difficult to move, compared to the joints located between the two positions. In other words, the resistance of the robot 200 applied to an operator for the operator to change the posture of the robot 200 is controlled in accordance with contact positions (positions) at which the operator is contacting the robot arm. In this manner, when the robot 200 is operated with both hands of an operator, the robot 200 can be moved in consideration of the operator's intention.

Figure 12:
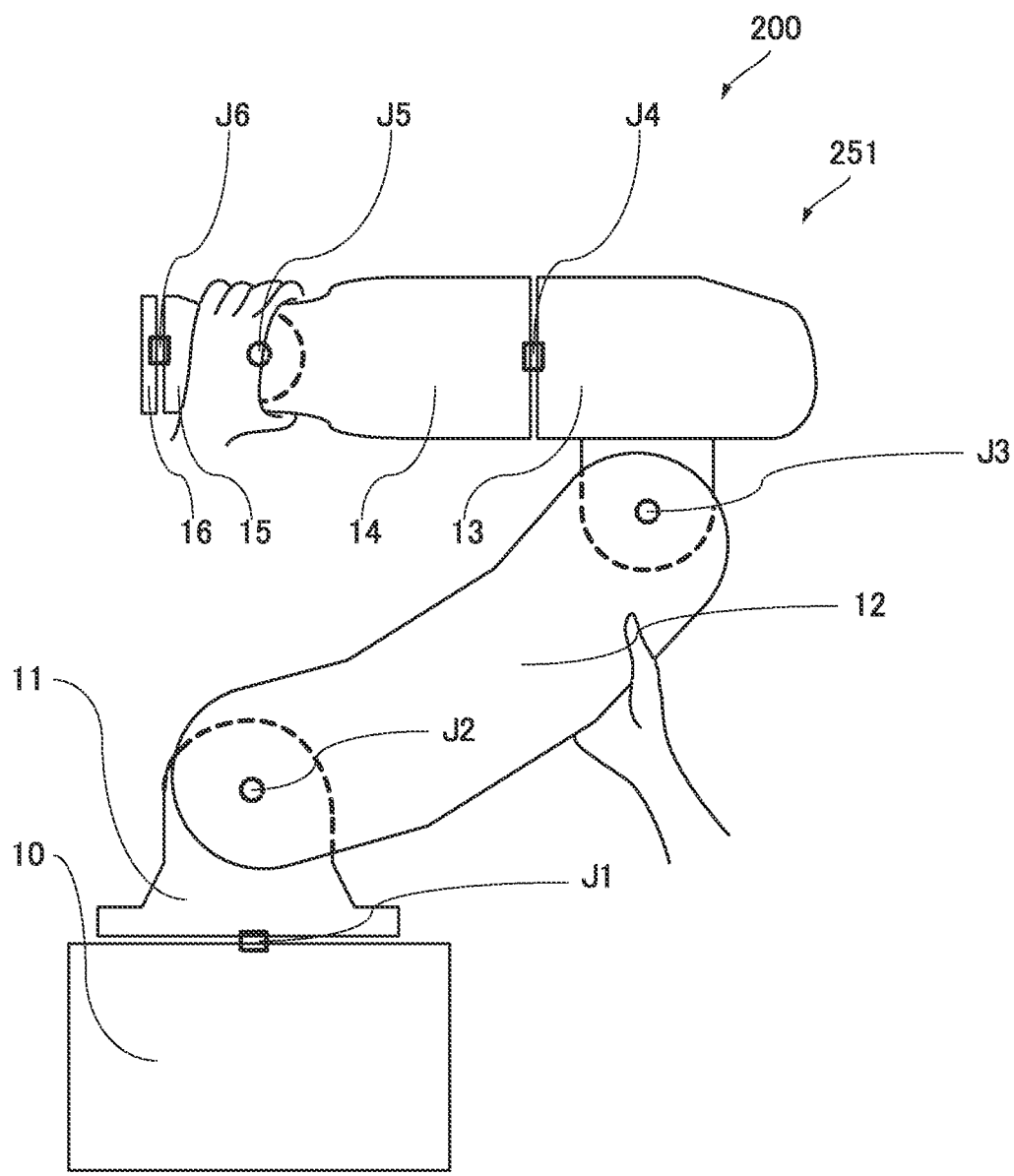
FIG. 12 is a schematic diagram illustrating a state where the fifth link is held and operated while the self weight of the robot arm is supported at a third link.

Control Performed when Self Weight of Robot is Supported by One Hand while Robot is Operated with Both Hands Next, the control performed when the self weight of the robot is supported by one hand while the robot is operated with both hands will be described with reference to FIG. 12. FIG. 12 is a schematic diagram illustrating a state where the fifth link is held and operated while the self weight of the robot arm is supported at the third link.

FIG. 12 illustrates a state where an operator unintentionally applies force in a falling direction to the fifth link 14 when holding the fifth link 14 with one hand and operating the robot 200, and then instantly supports the third link 12 with the other hand. That is, the operator is holding the third link 12 with the other hand for preventing the robot 200 from unintentionally falling. In this case, the external force (contact) is detected at a plurality of positions. In addition, the torque sensor 542 of the joint $J_2$ that detects the base-end-side external force detects external force applied in a direction in which the self weight of the robot 200 is supported.

In such a case, the CPU 301 makes it difficult for the joints $J_1$ to $J_2$ to move (the joints $J_1$ to $J_2$ are closer to the base end than the third link 12 in which the base-end-side external force is being detected is). As a result, the robot 200 can be prevented from unintentionally from falling. Specifically, first, the CPU 301 calculates the joint torques applied to the joints $J_1$ to $J_6$ from the position and posture of the robot 200. Then, for the joints $J_1$ to $J_2$ that are closer to the base end than the portion in which the base-end-side external force is being detected is, the CPU 301 compares the detected values of joint torque with the estimated values of joint torque that have been calculated. If the detected values are smaller than the estimated values, the CPU 301 determines that an operator is supporting the robot 200 for preventing the robot 200 from falling. Then the CPU 301 sets the force control parameters for making it more difficult for the joints $J_1$ to $J_2$ to move than the other joints $J_3$ to $J_6$ do. In this manner, when the robot 200 is operated with both hands of an operator, the robot 200 can be moved in consideration of the operator's intention.

As described above, if a person or an object contacts the robot 200 at one position (that is, with one hand) in the direct teach, the robot system 100 performs control such that the resistance value for moving the robot arm 251 is a first resistance value. The CPU 301 performs the control by performing the force control on the electric motors 211 to 216 of the joints $J_1$ to $J_6$. If an operator contacts the robot 200 at a plurality of positions (that is, with both hands), the CPU 301 performs control such that the resistance value for moving the robot arm 251 is a second resistance value larger than the first resistance value. As a result, the operability can be improved in both cases in which the robot arm is moved with one hand, and in which the robot arm is moved with both hands.

The robot system 100 perform a first control process in the direct teach when an object contacts the robot arm 251 at one position. In the first control process, the CPU 301 performs control such that the resistance value applied for moving the robot arm 251 is the first resistance value. In addition, when an object contacts the robot arm 251 at a plurality of positions, the CPU 301 performs a second control process such that the resistance value applied for moving the robot arm 251 is the second resistance value. Thus, a method of controlling a robot that includes the first control process and the second control process can be provided.

The robot system 100 performs a first teaching process in the direct teach when an object contacts the robot arm 251 at one position. In the first teaching process, the CPU 301 performs the control for teaching the robot 200 a trajectory, such that the resistance value applied for moving the robot arm 251 is the first resistance value. In addition, the robot system 100 performs a second teaching process in the direct teach when an object contacts the robot arm 251 at a plurality of positions. In the second teaching process, the CPU 301 performs the control for teaching the robot 200 a trajectory, such that the resistance value applied for moving the robot arm 251 is the second resistance value. Thus, a method of teaching a robot that includes the first teaching process and the second teaching process can be provided. Furthermore, a method of manufacturing products that includes a manufacturing process in addition to the first teaching process and the second teaching process can be provided. In the manufacturing process, products are manufactured by moving a robot arm along a trajectory, the data of which is stored in the first teaching process and the second teaching process.

Note that in the first embodiment, the description has been made for the control in which the second resistance value applied when an operator contacts the robot arm with both hands is made larger than the first resistance value applied when the operator contacts the robot arm with one hand. However, the present disclosure is not limited to this. For example, the relationship between resistance values is not limited to a specific relationship as long as the first resistance value and the second resistance value are made different from each other. For example, in a case where the robot 200 is operated with both hands, the resistance value of a portion of the robot arm on the base end side may be made larger for making the portion difficult to move, and the resistance value of a portion of the robot arm on the distal end side may be made smaller than the first resistance value for making it easy to adjust the position and posture of the robot arm.

Figure 13:
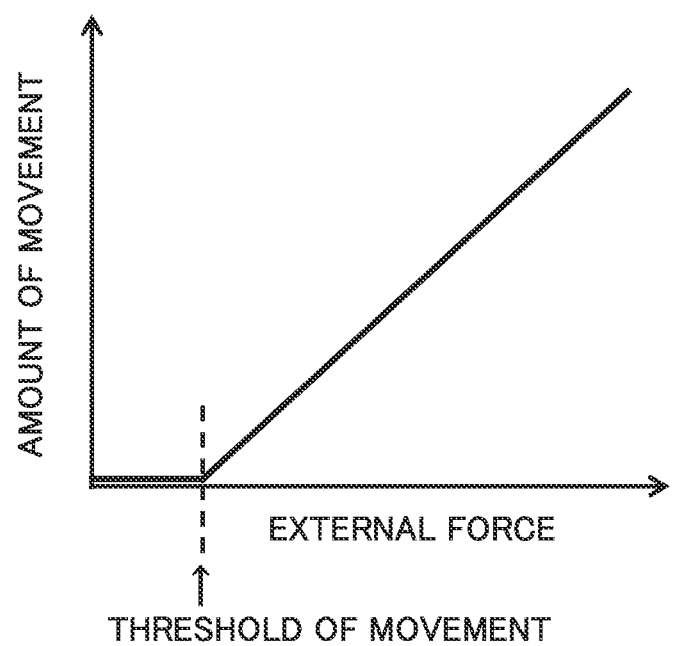
FIG. 13 is a graph illustrating resistance applied when the motion of a robot arm 251 is started under the control in the direct teach mode of the first embodiment.

In the above-described embodiment, the resistance value of the joints $J_1$ to $J_6$ is changed, depending on whether a person is contacting the robot arm at a plurality of positions. However, there is a case in which the relationship between the external force applied to a link and the amount of movement of the robot arm is set as illustrated in FIG. 13. Specifically, when the external force is applied to the link, the robot arm 251 does not move if the level of the external force does not exceed a predetermined threshold value. In such a case, the threshold value may be changed, depending on whether an operator contacts the robot arm at a plurality of positions. Specifically, if an operator contacts the robot arm at a plurality of (two) positions, that is, if the operator is holding the robot arm with both hands, the threshold value may be made larger than a default value. On the other hand, if an operator contacts the robot arm at a single position, that is, if the operator is holding the robot arm with one hand, the threshold value may be made smaller than the default value. As a result, it becomes possible to start to move the robot arm 251 with more force when the robot arm 251 is operated with both hands, and becomes possible to start to move the robot arm 251 with less force when the robot arm 251 is operated with one hand. Thus, the operability can be improved in both cases in which the robot arm is moved with one hand, and in which the robot arm is moved with both hands.

Second Embodiment

Figure 15:
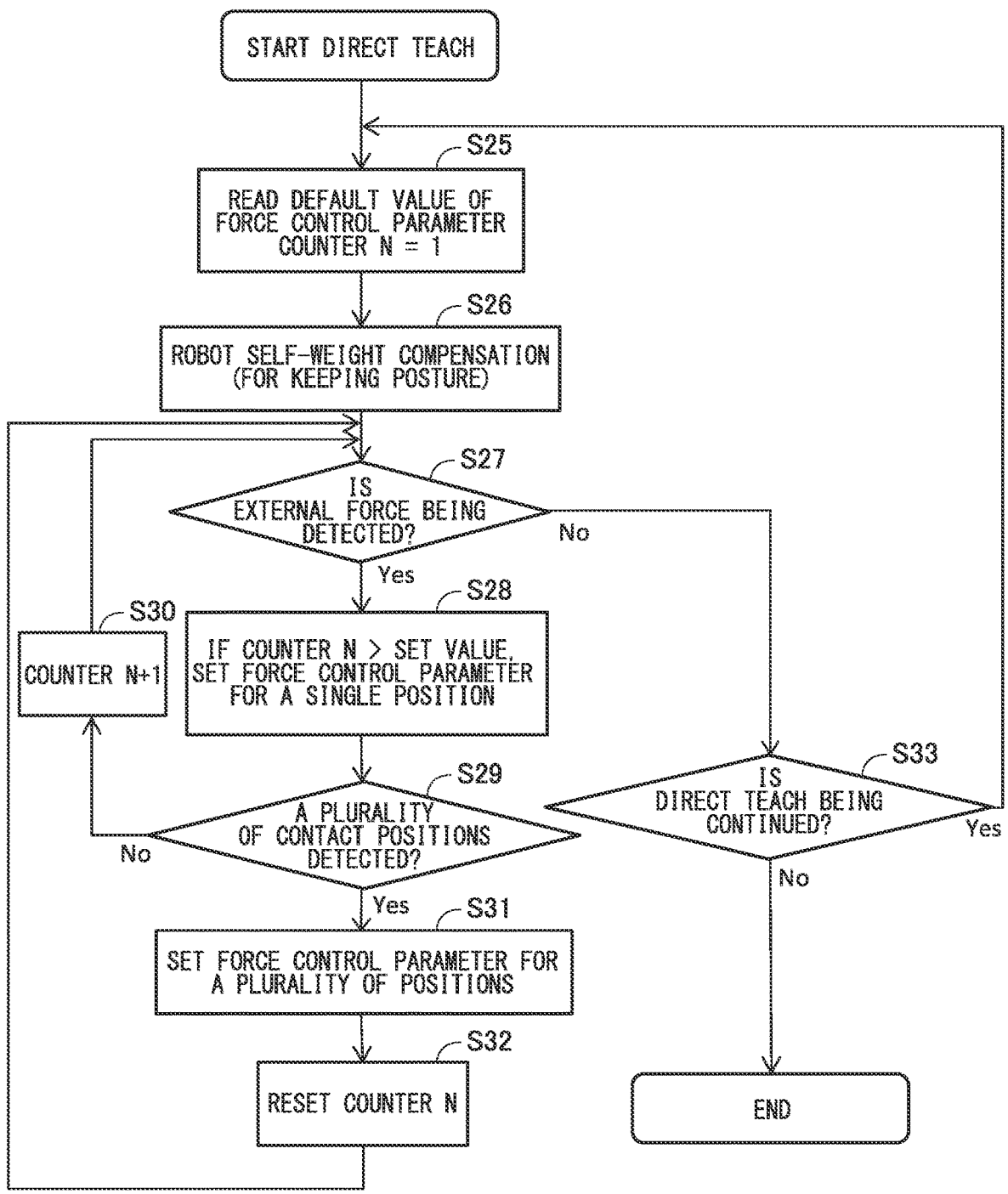
FIG. 15 is a flowchart illustrating the control in a direct teach mode of a second embodiment.

Next, a second embodiment will be described with reference to FIGS. 14A, 14B, 14C, and 15. In the second embodiment, part of the above-described first embodiment is changed. FIG. 14A is a schematic diagram illustrating a state where the fourth link and the sixth link are held and operated. FIG. 14B is a schematic diagram illustrating a state where a hand is separated from the fourth link in the state illustrated in FIG. 14A. FIG. 14C is a schematic diagram illustrating a stale where the third link is held in the state illustrated in FIG. 14B. FIG. 15 is a flowchart illustrating the control in a direct teach mode of the second embodiment. Note that in the second embodiment, a component identical to a component of the first embodiment is given an identical reference numeral, and the description thereof will be omitted.

The robot system 100 of the second embodiment differs from the robot system 100 of the first embodiment in the control performed when a state where an operator is holding the robot 200 with both hands is changed to a state where the operator is holding the robot 200 with one hand. For example, a worker holds the fourth link 13 and the fifth link 14 with both hands as illustrated in FIG. 14A, and then separates one hand from the fourth link 13. As a result, the worker holds only the fifth link 14 with one hand, as illustrated in FIG. 14B. After that, as illustrated in FIG. 14C, the worker holds the third link 12 with the hand separated from the fourth link 13. As a result, the worker holds the third link 12 and the fifth link 14 with both hands. Like this example, an operator often changes a holding position for changing the position and posture of the robot 200.

In such a case, the external force is detected temporarily at a single position, as illustrated in FIG. 14B. However, if the force control parameters are immediately changed depending on the temporary change of state, and the resistance value of the joints for making it difficult to change the position and posture of the robot is immediately changed, it may be difficult for an operator to evaluate the operability. Thus, in the second embodiment, the below-described control illustrated in FIG. 15 is performed for appropriately changing the force control parameters.

In the second embodiment, if the direct teach is started by the control apparatus 300, the CPU 301 reads default values of various force-control parameters and sets 1 to a counter N (S25).

Then the CPU 301 obtains angles (positions) of the joints $J_1$ to $J_6$ detected by the angle sensors 551 to 556, and calculates a posture of the robot arm 251. In addition, the CPU 301 calculates torques applied to the joints $J_1$ to $J_6$ by the self weight of the robot arm 251. Specifically, the CPU 301 calculates the torques by using pre-registered mechanical-model information (the mechanical model includes a model of the end effector attached to the distal end of the robot). Then, for keeping the posture of the robot arm 251, the CPU 301 performs servo control (self-weight compensation) to cancel the calculated torques applied to the joints $J_1$ to $J_6$. That is, the CPU 301 causes the electric motors 211 to 216 to output (calculated) torques to the joints $J_1$ to $J_6$ (S26).

Then, the CPU 301 detects the external force applied to the first to the sixth links 10 to 15 or the distal-end flange 16 (that is, an operation performed by a person), depending on the detection results from the torque sensors 541 to 546 of the joints $J_1$ to $J_6$ (S27). If the external force is not detected (S27: No), then the CPU 301 checks whether the direct teach is being continued (S33). If the direct teach is being continued (S33: Yes), then the CPU 301 returns to Step S25. Note that the external force applied to the first to the sixth links 10 to 16 may not be detected by using the torque sensors 541 to 546. For example, if the above-described contact sensors 710 to 716 can detect the external force, the external force may be detected by using the contact sensors 710 to 716.

If the external force applied to the first to the sixth links 10 to 15 or the distal-end flange 16 (that is, an operation performed by a person) is detected (S27: Yes), then the CPU 301 proceeds to Step S28. In Step S28, if the value of the counter N is larger than a set value (e.g., 5), then the CPU 301 sets default values, used for a case where the robot arm is held at a single position (or with one hand), to the damper coefficient D and the spring coefficient K, which are force control parameters. If the value of the counter N is equal to or smaller than the set value, the CPU 301 does not change the force control parameters (S28).

Then, the CPU 301 determines whether a person is contacting the robot arm at a plurality of positions, depending on the contact detection results from the contact sensors 710 to 716 (S29). That is, the CPU 301 determines which of one hand or both hands an operator is holding the robot arm with. If a plurality of (two) contact positions is detected, that is, if the robot arm is being held with both hands (S29: Yes), then the CPU 301 changes the damper coefficient D and the spring coefficient K, which are force control parameters, to a damper coefficient and a spring coefficient used for a case where an operator holds the robot arm at a plurality of positions (S31). That is, if an operator is holding the robot arm with both hands, the CPU 301 changes the force control parameters so that the resistance value of the joints $J_1$ to $J_6$ is a second resistance value. As a result, the joints $J_1$ to $J_6$ are made difficult to move, so that the first to the sixth links 10 to 15 are made difficult to move. Then the CPU 301 resets the counter N (S32), and returns to Step S27.

Note that also in a period of time in which the robot arm 251 is operated with both hands in this manner, positions of the robot arm 251 (the first to the sixth links 10 to 15) and the hand tool 252 are detected by the angle sensors (position sensors) 551 to 556 of the joints $J_1$ to $J_6$. The control apparatus 300 stores a trajectory of the robot 200, produced from the positional detection results (a second teaching process).

If one contact position is detected, that is, if the robot arm is held with one hand (S29: No), then the CPU 301 increments the counter N by one (S30) and returns to Step S27. That is, even if a state where the robot arm 251 is held with both hands is changed to a state where the robot arm 251 is held with one hand, the force control parameters, which have been set for a case where an operator holds the robot arm 251 at a plurality of positions (see S31), are kept if the value of the counter N does not exceed a set value (e.g., 5). If the determination in Step S29 and the process in Step S30 are repeated in a control cycle, and a predetermined set time (e.g., a few seconds) has elapsed, the value of the counter N exceeds the set value (e.g., 5). Then, the CPU 301 changes the force control parameters into force control parameters used for a case where an operator holds the robot am at a single position, and thereby changes the resistance value of the joints $J_1$ to $J_6$ to a first resistance value. That is, the CPU 301 makes it easy for the joints $J_1$ to $J_6$ to move, and thereby makes it easy for the first to the sixth links 10 to 15 to move.

Note that even if a state where the robot arm is held with both hands is temporarily changed to a state where the robot arm is held with one hand, the joints $J_1$ to $J_6$ remain difficult to move if the set time (e.g., a few seconds) has not elapsed. In this operation, in a period of time from when an operator separates one hand from the robot arm 251 until when the operator holds the robot arm 251 with the one hand again, it is prevented that the robot arm 251 is unexpectedly moved with weak force. Thus, an operator can easily evaluate the good operability.

Note that while the robot arm 251 is held with one hand and operated, the resistance value of the joints $J_1$ to $J_6$ is the second resistance value in some period of time, and is the first resistance value in some period of time. However, also in such a period of time, positions of the robot arm 251 (the first to the sixth links 10 to 15) and the hand tool 252 are detected by the angle sensors (position sensors) 551 to 556 of the joints $J_1$ to $J_6$. The control apparatus 300 stores a trajectory of the robot 200, produced from the positional detection results. Note that in the second embodiment. When the resistance value of the joints $J_1$ to $J_6$ is the second resistance value, the teaching is performed in a second teaching process, and when the resistance value of the joints $J_1$ to $J_6$ is the first resistance value, the teaching is performed in a first teaching process.

If the external force is not detected (S27: No) and a command to end the direct teach is inputted by using the teaching pendant 400 or the like (S33: No), then the CPU 301 ends the direct teach. Note that the present embodiment and a modification thereof may be combined with the above-described various embodiments and modifications thereof.

In summary, in the present embodiment, the control is performed such that the resistance of the robot 200 applied to an operator (user) for the operator to move the robot 200 is controlled (S29: No, S31) in accordance with contact positions at Which the operator contacts the robot arm (S29), and the contact positions are determined by using signals from the plurality of contact sensors 710 to 716. In other words, the resistance of the robot applied to an operator for the operator to change the posture of the robot is controlled in accordance with (the number of) contact positions at which the operator is contacting the robot arm.

Third Embodiment

Figure 16:
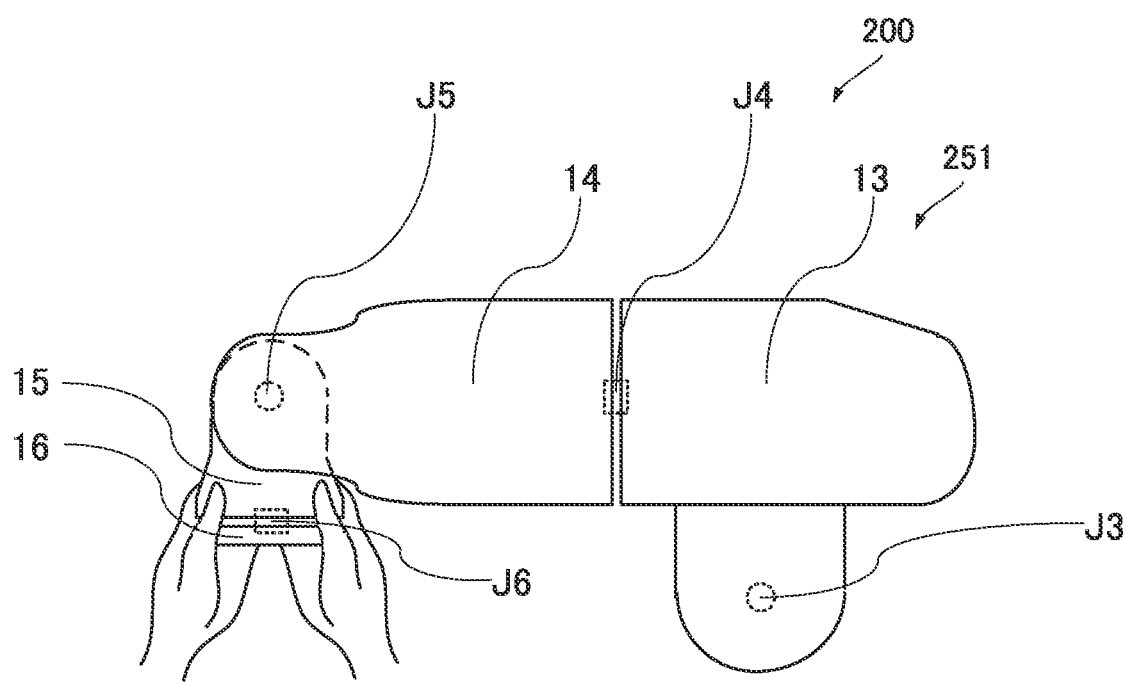
FIG. 16 is a schematic diagram illustrating a state where the sixth link is held with both hands and operated.
Figure 17:
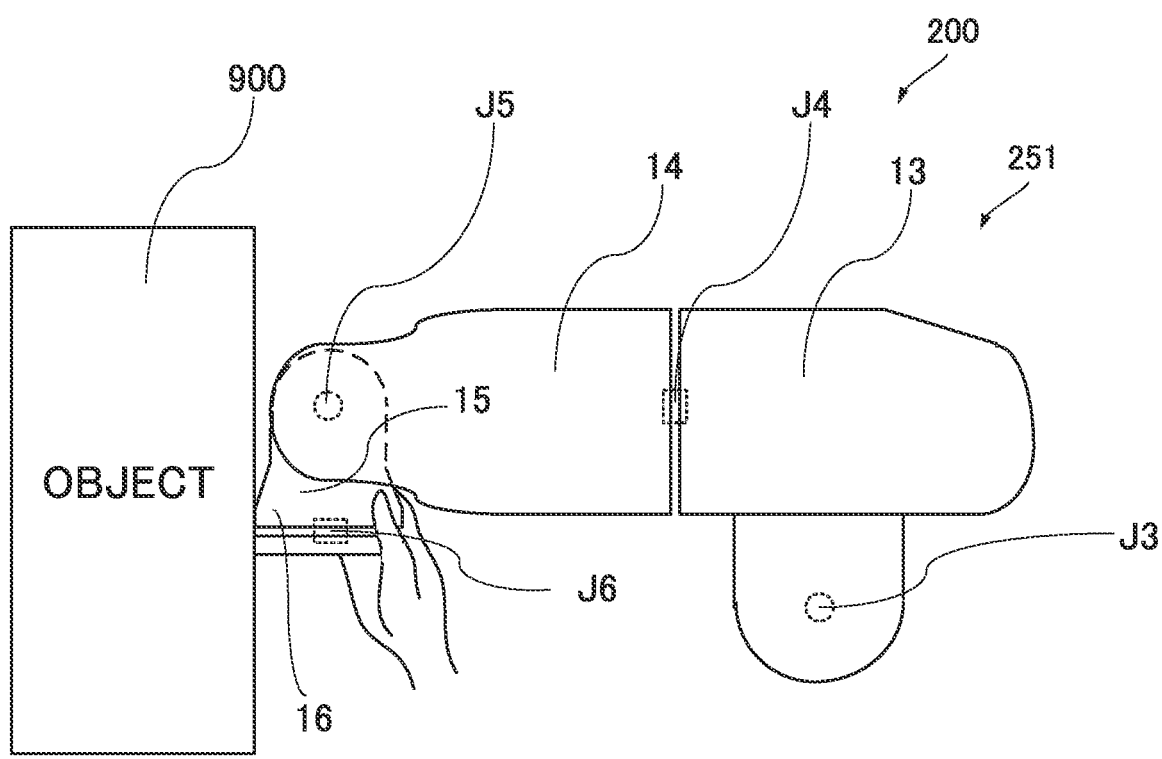
FIG. 17 is a schematic diagram illustrating a state where the sixth link is brought into contact with an object while the sixth link is held with one hand and operated.

Next, a third embodiment will be described with reference to FIGS. 16 and 17. In the third embodiment, part of the above-described first and second embodiments is changed. FIG. 16 is a schematic diagram illustrating a state where the sixth link is held with both hands and operated. FIG. 17 is a schematic diagram illustrating a state where the sixth link is brought into contact with an object while the sixth link is held with one hand and operated. Note that in the third embodiment, a component identical to a component of the first and the second embodiments is given an identical reference numeral, and the description thereof will be omitted.

The third embodiment differs from the first and the second embodiments in that a plurality of contact sensors are disposed in a link. Hereinafter, the description will be made for the control performed when the link is held with both hands of an operator, or when the link is brought into contact with an object by an operator holding the link with one hand. That is, in the robot 200 of the third embodiment, each of the contact sensors 710 to 716, disposed on surfaces of the first to the sixth links 10 to 15 and the distal-end flange 16, includes two contact sensors, as illustrated in FIG. 2. Preferably, the two contact sensors of each of the contact sensors 710 to 716 are disposed such that an operator cannot (or can hardly) contact the two contact sensors with one hand at the same time. Note that three or more contact sensors may be disposed on one link. In addition, a single contact sensor may be disposed on a single link. In this case, an operation with one hand, an operation with both hands, or another operation may be determined, based on the size or distribution of contact areas, for example.

In a case where an operator holds and operates a link (the sixth link 15 in FIG. 16) with both hands as illustrated in FIG. 16, the operator often moves the link slightly (that is, performs fine adjustment on the link). Humans are not good at continuing to apply a constant force in a constant direction. Because a hand vibrates when moving the robot arm, the robot arm meanders more or less when moving toward a target position (or taking a target posture). When an operator needs to move the robot arm slightly (or perform fine adjustment on the robot arm) in the direct teach, the robot arm is often located near to a target position (or taking a posture nearly equal to a target posture). Thus, if the operability is poor, the robot arm moves past and away from the target position, making it difficult to reach the target position. Thus, when a link is operated with both hands, the force control parameters are changed such that the resistance of the link applied to an operator for moving the link is made larger in all directions, than the resistance of different links applied to the operator when the links are operated with both hands as described above. With this operation, unstable components of force produced by the vibration of a hand are reduced, and the robot 200 can be operated with strong resistance force so that the robot arm hardly moves past and away from a target position.

In addition, as illustrated in FIG. 17, when a link (the sixth link 15 in FIG. 17) is held with one hand and operated, and brought into contact with an object 900, the force control parameters are also changed so that the resistance value is increased. Preferably, the force control parameters are changed and made larger than those determined in a case where different links are held with both hands, as described above. Thus, when the robot 200 contacts the object 900, the robot 200 hardly sinks in the object 900 because the robot 200 is operated with strong resistance force. Note that the present embodiment and a modification thereof may be combined with the above-described various embodiments and modifications thereof.

Fourth Embodiment

Figure 18:
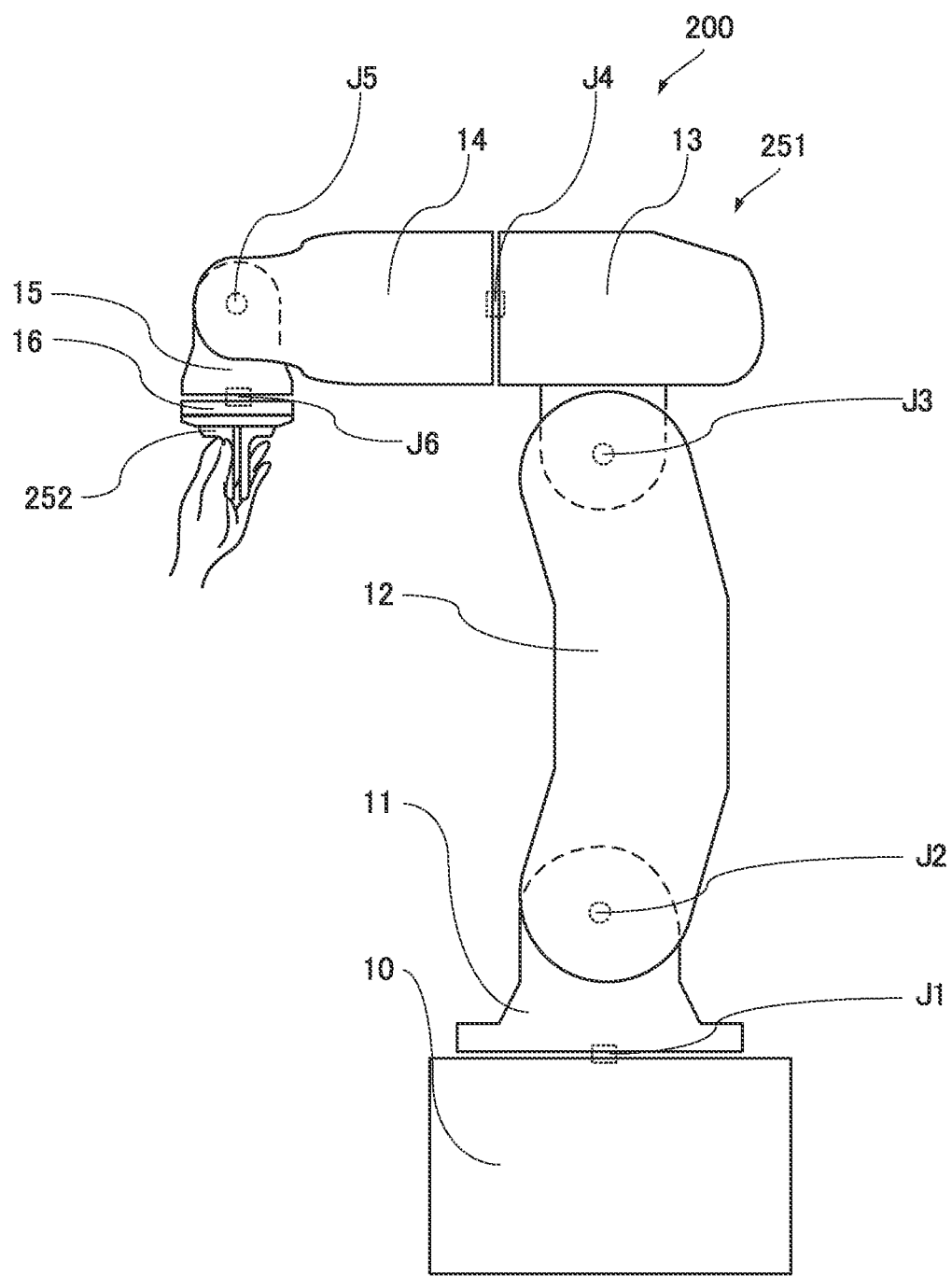
FIG. 18 is a schematic diagram illustrating a state where a tool is held with one hand and operated.
Figure 19:
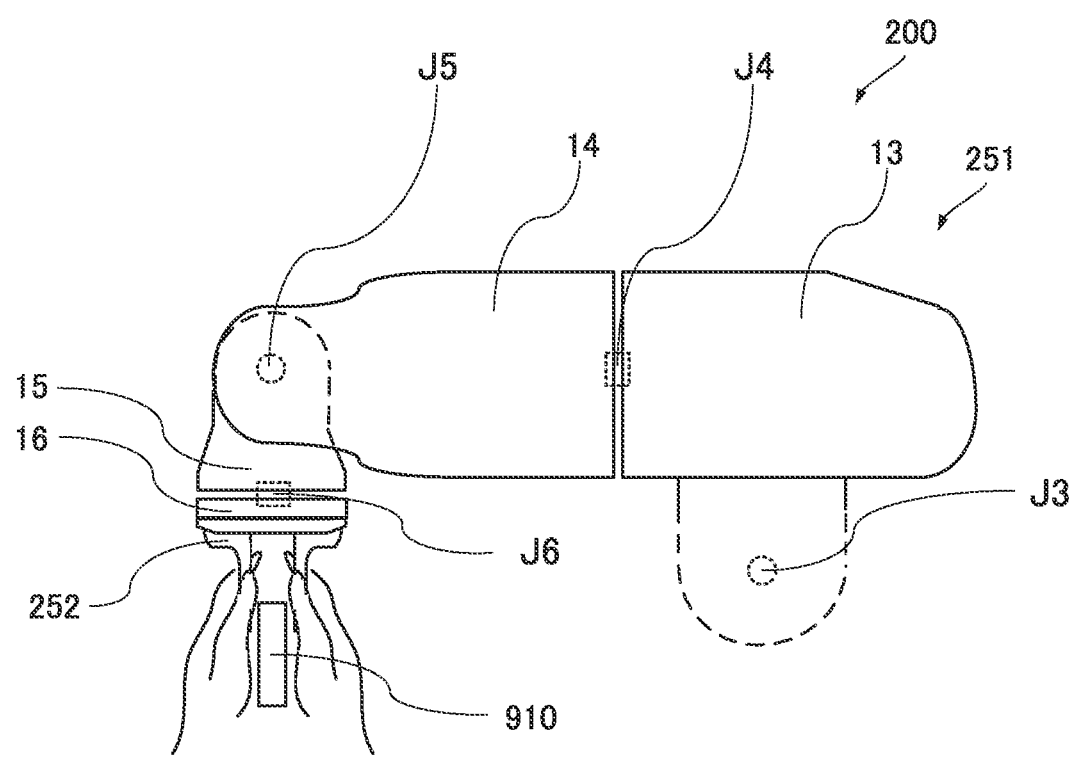
FIG. 19 is a schematic diagram illustrating a state where the tool is held with both hands and operated.

Next, a fourth embodiment will be described with reference to FIGS. 18 and 19. In the fourth embodiment, part of the above-described first to third embodiments is changed. FIG. 18 is a schematic diagram illustrating a state where a tool is held with one hand and operated. FIG. 19 is a schematic diagram illustrating a state where the tool is held with both hands and operated. Note that in the fourth embodiment, a component identical to a component of the first to the third embodiments is given an identical reference numeral, and the description thereof will be omitted.

The fourth embodiment differs from the above-described first to third embodiments in that a hand tool 252 is attached to the distal-end flange 16 of the robot 200. Hereinafter, the description will be made for the control performed when the hand tool 252 is held and operated by an operator. That is, in the robot 200 of the fourth embodiment, a contact sensor is disposed on a surface of the hand tool 252, or on a connection portion of the distal-end flange 16 to which the hand tool 252 is connected. The contact sensor serves as an end-effector contact detection portion (not illustrated). Note that a torque sensor may be used instead of the contact sensor.

As illustrated in FIG. 18, in a case where an operator holds and operates the hand tool 252 with one hand (or both hands) in the direct teach, the operator often positions the hand tool 252 with respect to a workpiece, on which the work is performed. In this case, it is not preferable that the posture of the hand tool 252, or the angle of the distal-end flange 16, is changed.

In addition, as illustrated in FIG. 19, in a case where the hand tool 252 is opened and closed by an operator holding the hand tool 252 with both hands in the direct teach, the force produced by opening and closing the hand tool 252 is transmitted to the robot arm 251. In a case where the hand tool 252 is operated (for example, the hand tool 252 is opened and closed), a work plane (or the position and posture of the hand tool 252 in some cases) on which the hand tool 252 performs work on a workpiece 910 (which is an object on which the work is to be performed) is often fixed. Thus, it is not preferable that when an operator operates the hand tool 252, the angle of the distal-end flange 16 of the robot arm 251 is changed.

For this reason, the contact sensor is disposed on a surface of the hand tool 252, or on a connection portion of the distal-end flame 16 to which the hand tool 252 is connected; and the contact sensor detects the external force applied to the hand tool 252, or detects that an operator starts to hold and operate the hand tool 252. If the contact sensor detects that an operator starts to contact the hand tool 252, the CPU 301 changes the force control parameters, as described above. In this operation, the resistance value of the joints $J_1$ to $J_6$ is made larger than the resistance value produced when the contact between an operator and the above-described first to sixth links 10 to 15 (or the external force applied to the first to sixth links 10 to 15) is detected, so that the robot arm is made difficult to move in a direction in which the angle of the distal-end flange 16 is changed. In this case, the resistance value produced in the direction in which the angle of the distal-end flange 16 is changed has only to be larger than the above-described first resistance value produced when the first to the sixth links 10 to 15 are held with one hand. Preferably, the resistance value produced in the direction in which the angle of the distal-end flange 16 is changed is made larger than the above-described second resistance value produced when the first to the sixth links 10 to 15 are held with both hands. With this control, when an operator performs the direct teach by holding the hand tool 252 with one hand or both hands, the relationship of the work plane between the workpiece 910 and the hand tool 252 can be kept. Thus, the operator can easily perform adjustment, such as alignment between the hand tool 252 and the workpiece 910.

In the fourth embodiment, the description has been made for the case where if the contact sensor detects that an operator contacts the hand tool 252, the CPU 301 changes the operability by changing the force control parameters. However, the method of changing the control is not limited to this. For example, the CPU 301 may perform position control such that the robot arm moves, step by step, by a unit of motion, in a direction in which the external force detected is being applied to the hand tool 252. The unit of motion is the preset amount of movement. In this case, the operability may be changed by adjusting the amount of movement. Note that the present embodiment and a modification thereof may be combined with the above-described various embodiments and modifications thereof.

Fifth Embodiment

Figure 20:
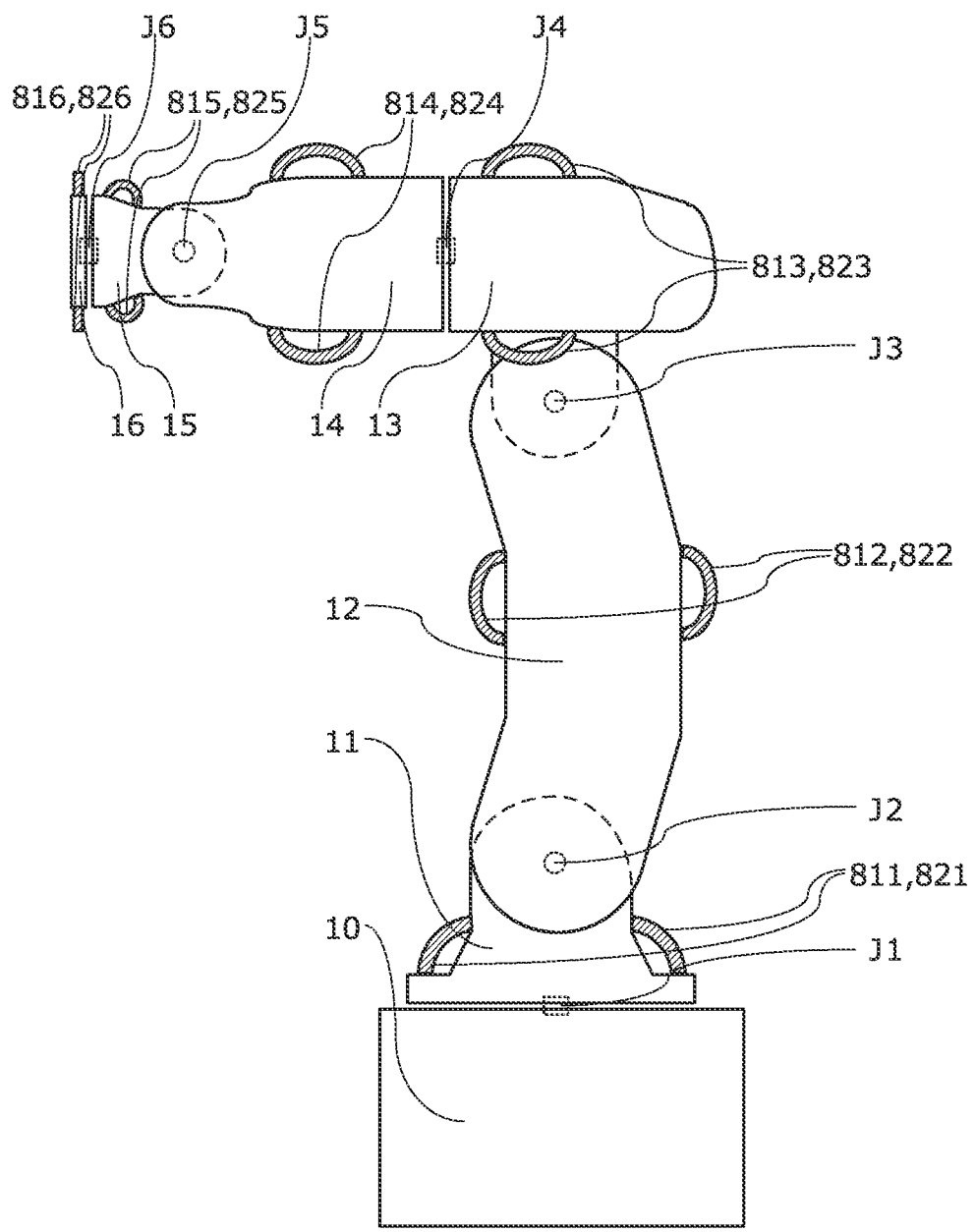
FIG. 20 is a schematic diagram illustrating a robot arm of a fifth embodiment.

Next, a fifth embodiment will be described with reference to FIG. 20, In the fifth embodiment, part of the above-described first to fourth embodiments is changed. FIG. 20 is a schematic diagram illustrating a robot arm 251, handles 811 to 816, and contact sensors 821 to 826 of the fifth embodiment. Note that in the fifth embodiment, a component identical to a component of the first to the fourth embodiments is given an identical reference numeral, and the description thereof will be omitted.

As illustrated in FIG. 20, the first to the sixth links 10 to 15 of the robot arm 251 are provided with the handles 811 to 816 for moving the robot arm 251 in the direct teach. Each of the handles 811 to 816 includes a plurality of (at least two) handles. In addition, the color of a handle is made different from the color of a corresponding link. In addition, portions of the handles 811 to 816 (held by a user) are respectively provided with contact sensors 821 to 826. Since the handles having respective contact sensors are provided, a user holds any of the handles 811 to 816 of the robot arm when performing the direct teach. Thus, the contact sensors 821 to 826 can reliably detect a portion of the robot arm 251 that a user is contacting.

Each link has two or more handles, and each handle is provided with a contact sensor. Thus, based on the output values from the contact sensors, a case where a user is contacting the robot arm 251 with one hand, a case where a user is contacting a link with both hands, and a case where a user is contacting one link with one hand and another link with the other hand can be easily determined. Thus, in accordance with the way of contact, the robot can select appropriate force control parameters (such as the damper coefficient D and the spring coefficient K), and control the resistance value of the joints $J_1$ to $J_6$.

Figure 21:
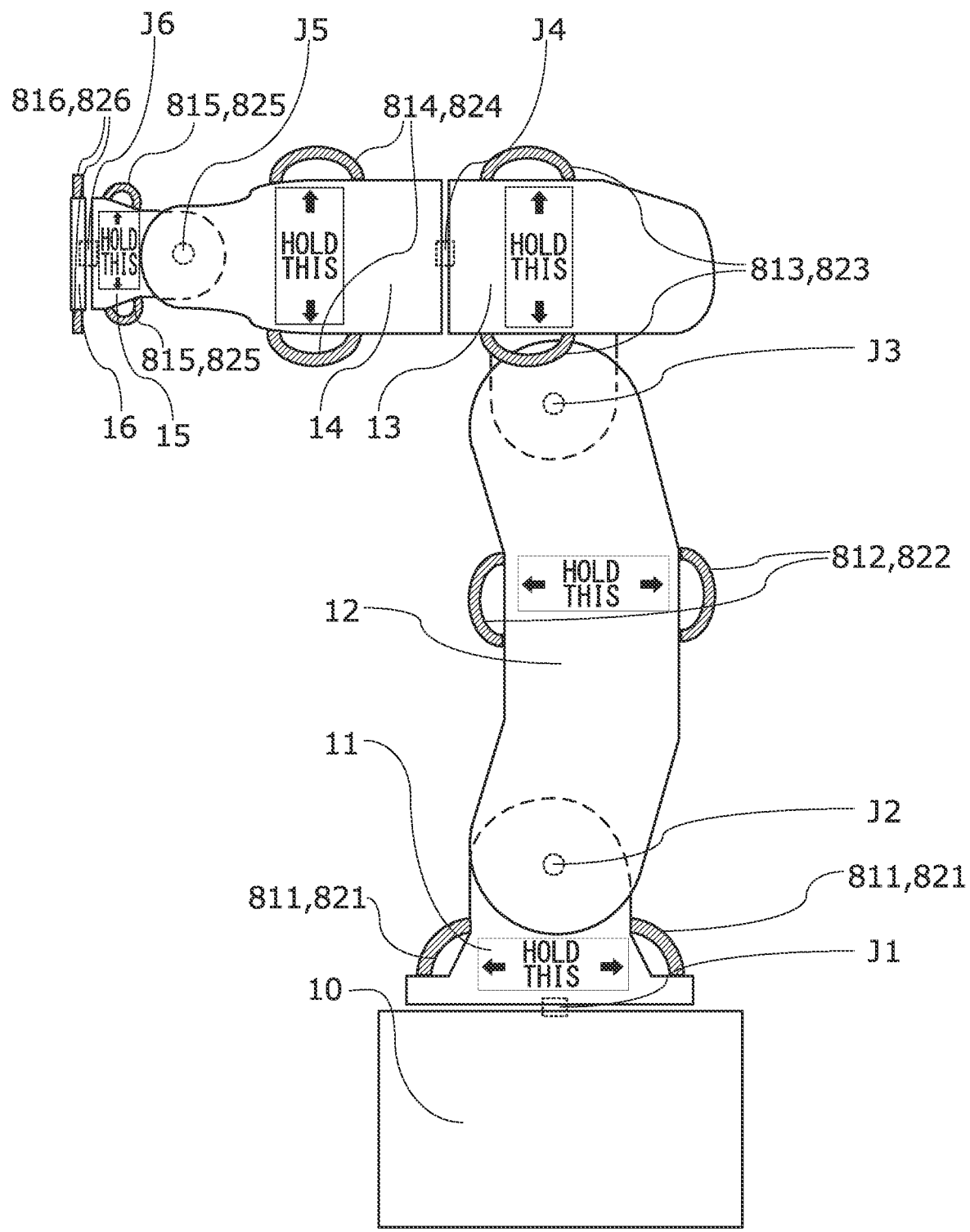
FIG. 21 is a schematic diagram illustrating a robot arm of the fifth embodiment.

In the present embodiment, the hand tool 252 is not provided with a handle. However, the hand tool 252 may also be provided with a handle, and the handle may be provided with a contact sensor. In addition, for preventing an operator from holding a portion of a link other than a corresponding handle for moving the robot arm, an instruction (instruction portion) and an arrow may be displayed, as illustrated in FIG. 21, in a handle or in the vicinity of the handle (or around the handle) for attracting user's attention. For example, the instruction may be a message "Hold this".

Figure 22:
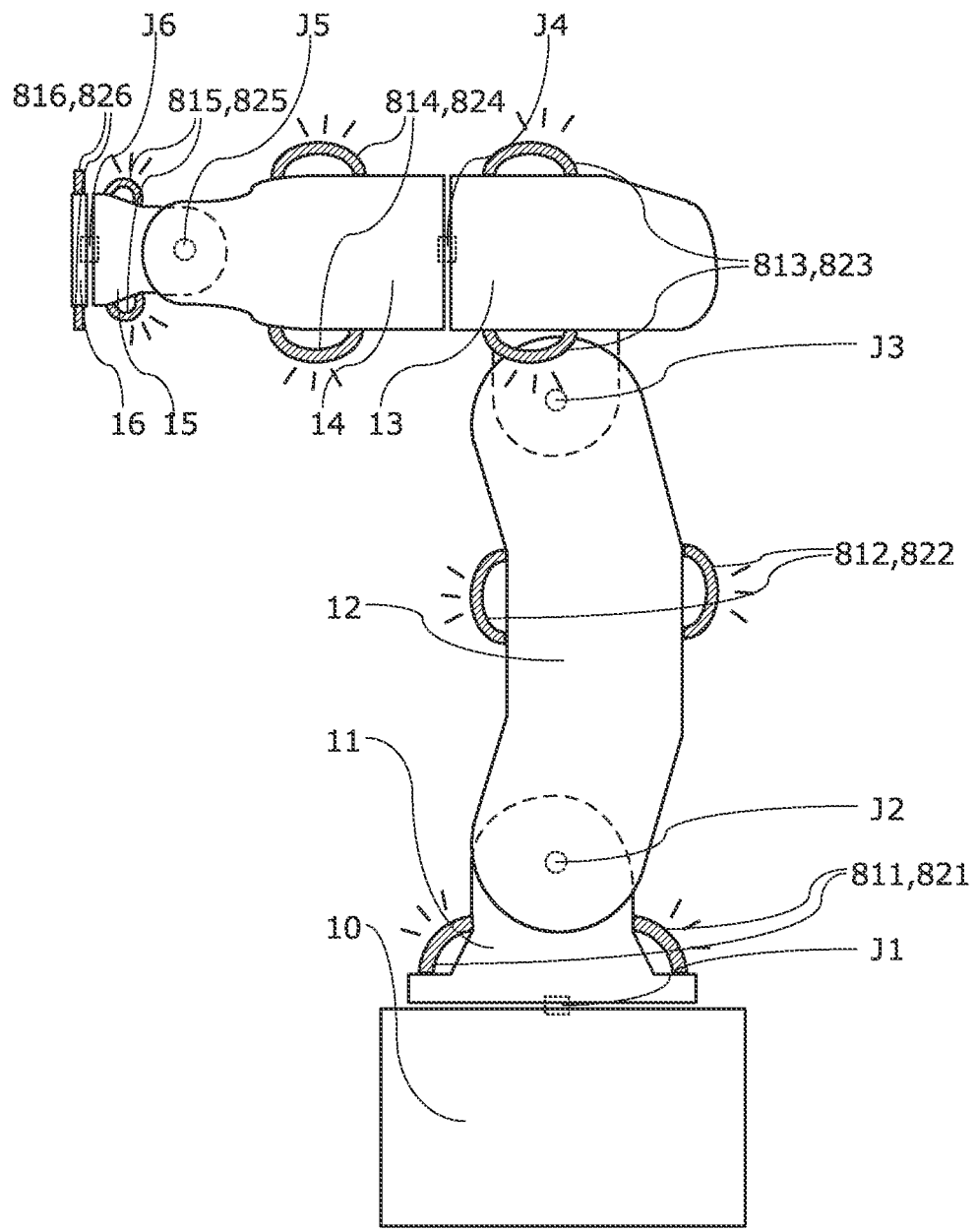
FIG. 22 is a schematic diagram illustrating a robot arm of the fifth embodiment.

In addition, as illustrated in FIG. 22, an indicator may be disposed in each of the handles 811 to 816. In this case, the indicator urges a user to hold a predetermined portion by emitting light. Note that the present embodiment and a modification thereof may be combined with the above-described various embodiments and modifications thereof.

Sixth Embodiment

Figure 23A:
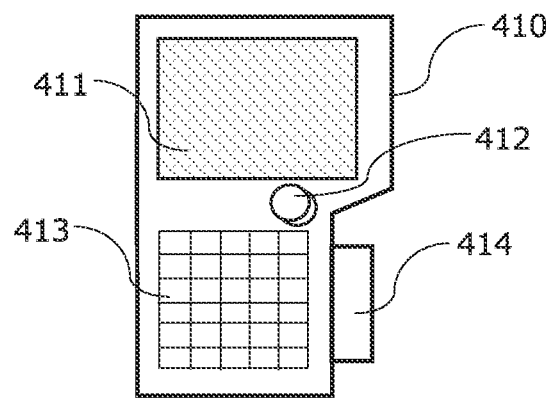
FIG. 23A is a schematic diagram illustrating a teaching pendant of a sixth embodiment.
Figure 23B:
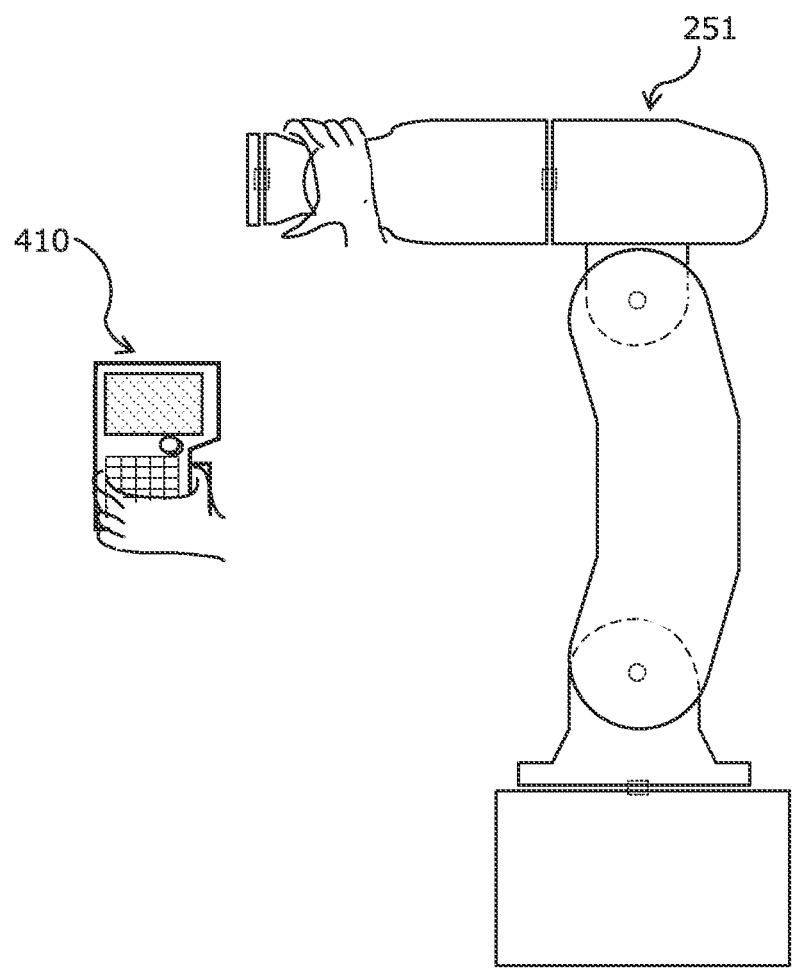
FIG. 23B is a schematic diagram illustrating a state where an operator performs direct teach on a robot arm while holding the teaching pendant of the sixth embodiment.
Figure 24:
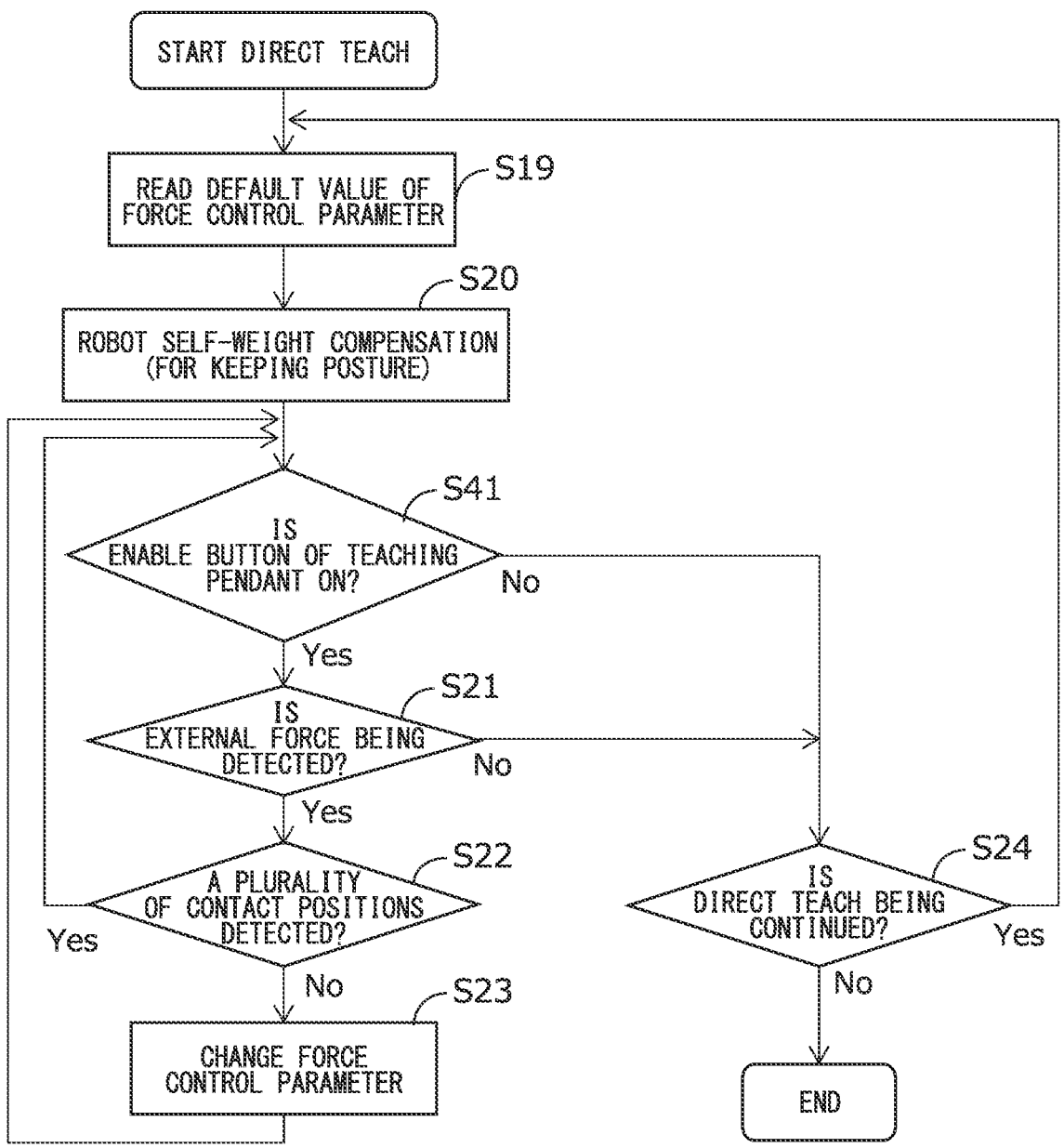
FIG. 24 is a flowchart illustrating the control performed in a direct teach mode of the sixth embodiment.

Next, a sixth embodiment will be described with reference to FIGS. 23A, 23B, and 24. In the sixth embodiment, part of the above-described first to fifth embodiments is changed. FIG. 23A illustrates a teaching pendant 410. FIG. 23B illustrates a state where an operator performs the direct teach on the robot arm 251 while holding the teaching pendant 410. FIG. 24 is a flowchart illustrating the control performed in a direct teach mode of the sixth embodiment.

As illustrated in FIG. 23A, a display screen 411, an emergency stop button 412, and an operation panel 413 are disposed on a front surface of the teaching pendant 410, and a three-position enable button 414 is disposed on a side surface of the teaching pendant 410. The three-position enable button 414 is OFF in a state where the enable button 414 is not operated, ON in a state where the enable button 414 is pushed lightly, and OFF in a state where the enable button 414 is further pushed strongly. The three-position enable button 414 is the same as a three-position enable button of a commonly-known teaching apparatus. As illustrated in FIG. 23B, when a user operates the robot arm 251 while pushing the enable button 414 lightly, the user often operates the robot arm 251 with one hand. Thus, when a user performs the direct teach while pushing the enable button 414 lightly, the user operates the robot arm with one hand, and thus, will get tired easily.

Next, the control performed in the direct teach of the sixth embodiment will be described with reference to FIG. 24. For simplifying the description, the description for the same processes as those of the above-described various embodiments will be omitted. In FIG. 24, after Step S20, the CPU 301 determines in Step S41 whether the enable button 414 of the teaching pendant 410 is ON. If the enable button 414 is not ON (S41: No), then the CPU 301 does not perform the robot arm operation performed when the external force is detected, proceeds to Step S24, and checks whether the direct teach is being continued. If the direct teach is being continued (S24: Yes), then the CPU 301 returns to Step S19. If the direct teach is not being continued (S24: No), then the CPU 301 ends the direct teach.

If the enable button of the teaching pendant 410 is ON in Step S41 (S41: Yes), then the CPU 301 proceeds to Step S21. Then, the CPU 301 detects the external force applied to the first to the sixth links 10 to 15 or the distal-end flange 16 (that is, an operation performed by a person), depending on the detection results from the torque sensors 541 to 546 of the joints $J_1$ to $J_6$. If the external force is not detected (S21: No), then the CPU 301 proceeds to the above-described Step S24.

If the external force (or an operation performed by a person) is detected (S21: Yes), then the CPU 301 proceeds to Step S22, and determines whether a person is contacting the robot arm at a plurality of (two) positions, depending on the contact detection results from the contact sensors 710 to 716 or on the output values from the torque sensors 541 to 546. If a person is contacting the robot arm at a plurality of positions (S22: Yes), then the CPU 301 returns to Step S41.

If a person is contacting the robot arm at a single (one) position, that is, if a person is operating the robot arm 251 with one hand while operating the teaching pendant 410 (S22: No), then the CPU 301 proceeds to Step S23. In Step S23 of the present embodiment, the CPU 301 changes the damper coefficient D and the spring coefficient K of the above-described force control parameters, and changes the resistance value to a value (third resistance value) smaller than a default value. That is, the CPU 301 changes the control so that the robot arm 251 is easily moved by a user. Then the CPU 301 returns to Step S41 and repeats the above-described processes.

Note that although not illustrated in FIG. 24 as in FIG. 9A, if a state where an operator is operating the robot arm with one hand is changed to a state where the operator is operating the robot arm with both hands (S22: Yes), then the CPU 301 changes the force control parameters to the default values. In addition, although the CPU 301 determines the contact positions at which a user is contacting the robot arm 251, in Step S22 of the present embodiment, the CPU 301 may proceed to Step S23 without performing Step S22. This is because a user often operates the robot arm with one hand in the direct teach when the enable button is ON.

As described above, in the sixth embodiment, the robot arm 251 can be operated in accordance with the external force only when the enable button 414 of the teaching pendant 410 is ON. As a result, the risk that an operator unintentionally moves the robot arm 251 can be reduced. In addition, the fatigue of a user who is operating the robot arm 251 with one hand can be reduced. Thus, the operability can be improved in both cases in which the robot arm is moved with one hand, and in which the robot arm is moved with both hands. Note that the present embodiment and a modification thereof may be combined with the above-described various embodiments and modifications thereof.

Seventh Embodiment

Figure 25:
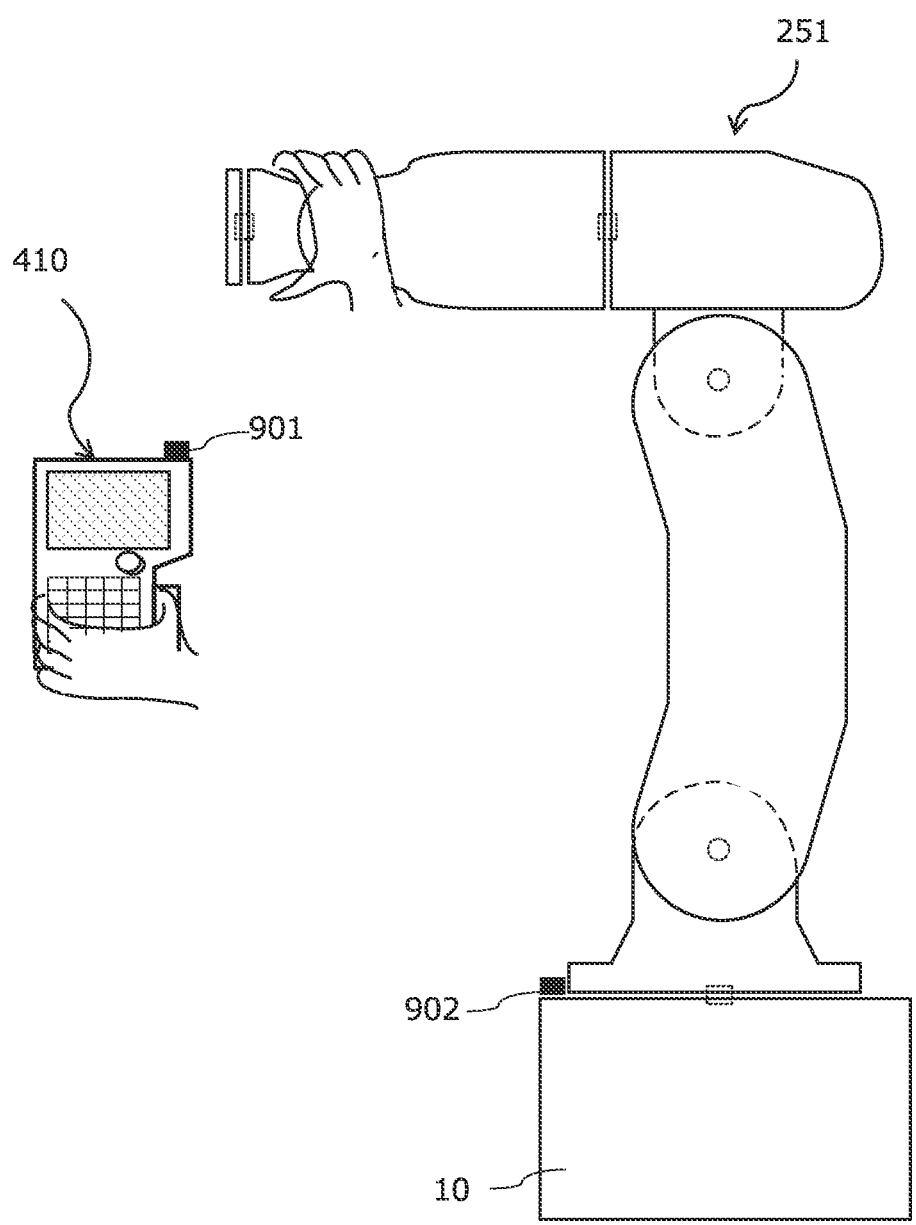
FIG. 25 is a schematic diagram illustrating distance sensors of a seventh embodiment that obtain a distance between a teaching pendant and a robot arm.
Figure 26:
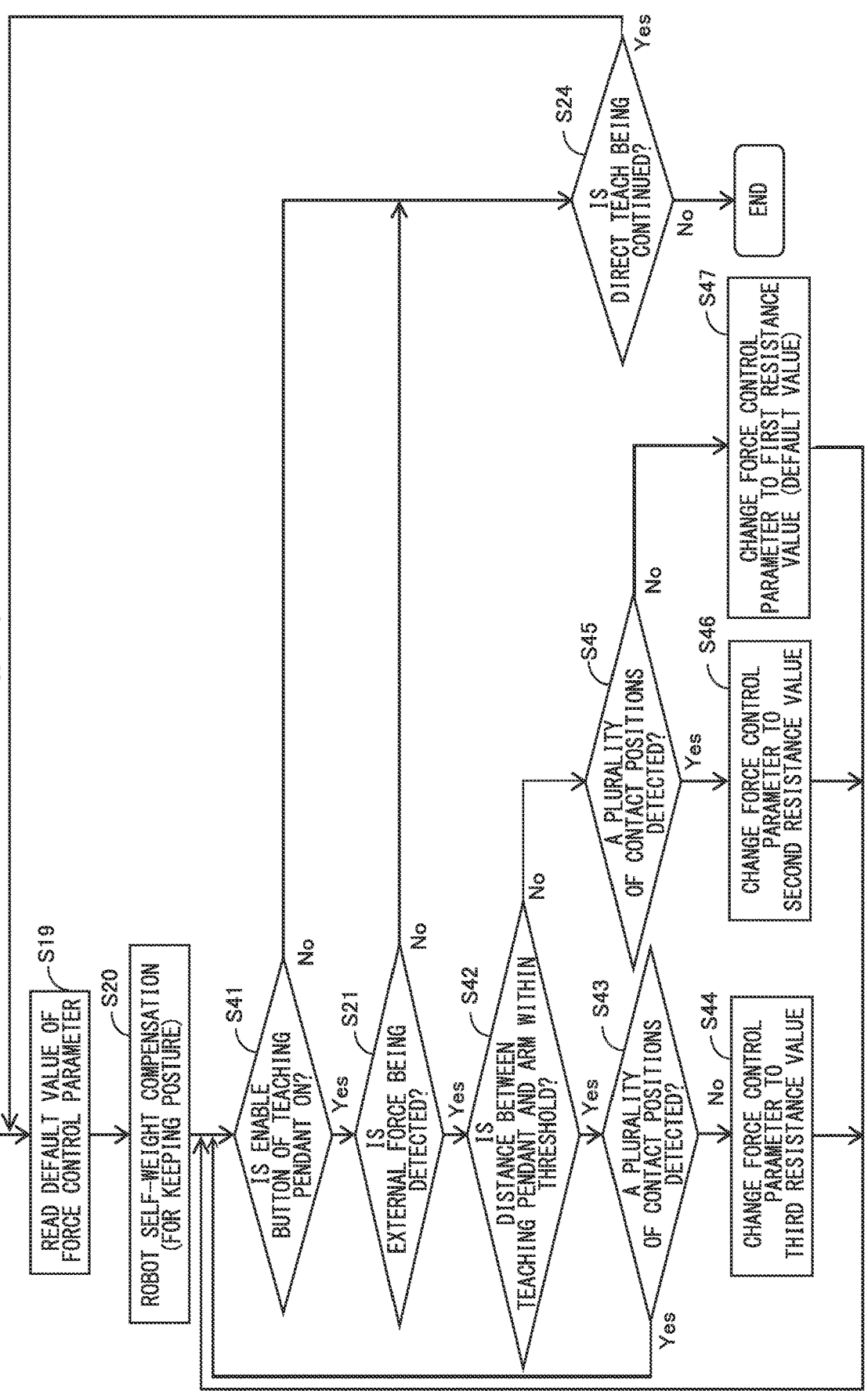
FIG. 26 is a flowchart illustrating the control performed in a direct teach mode of the seventh embodiment.

Next, a seventh embodiment will be described with reference to FIGS. 25 and 26. In the seventh embodiment, part of the above-described first to sixth embodiments is changed. FIG. 25 is a diagram illustrating a robot arm 251 and a teaching pendant 410 of the seventh embodiment. FIG. 26 is a flowchart illustrating the control performed in a direct teach mode of the seventh embodiment. For simplifying the description, the description for the same processes as those of the above-described embodiments will be omitted.

As illustrated in FIG. 25, in the seventh embodiment, distance sensors 901 and 902 are disposed for wirelessly measuring the distance between the teaching pendant 410 and the robot arm 251. Thus, the force control parameters are changed depending on the measured distance, as described below. The distance sensor 901 is disposed on the teaching pendant 410. The distance sensor 902 is disposed on a portion (the first link 10) of the robot arm 251 that is not moved by the change of posture of the robot arm 251. The information on the measured distance is transmitted from the teaching pendant 410 or the robot arm 251 to the control apparatus 300.

Specifically, the distance sensor 901 includes a radio-wave transmitting unit, and the distance sensor 902 includes a radio-wave receiving unit. The radio-wave receiving unit measures the intensity of radio wave transmitted from the radio-wave transmitting unit, and thereby detects the distance. Note that the distance sensor 901 may include a radio-wave receiving unit and the distance sensor 902 may include a radio-wave transmitting unit. In another case, the distance may be measured by another sensor as long as the other sensor can detect the distance between the teaching pendant 410 and the robot arm 251.

In FIG. 26, after Step S20, the CPU 301 determines in Step S41 whether the enable button 414 of the teaching pendant 410 is ON. If the enable button 414 is not ON (S41: No), then the CPU 301 does not perform the robot arm operation performed when the external force is detected, proceeds to Step S24, and checks whether the direct teach is being continued. If the direct teach is being continued (S24: Yes), then the CPU 301 returns to Step S19. If the direct teach is not being continued (S24: No), then the CPU 301 ends the direct teach.

If the enable button 414 of the teaching pendant 410 is ON (S41: Yes), then the CPU 301 proceeds to Step S21, and detects the external force (or an operation performed by a person) applied to the first to the sixth links 10 to 15 or the distal-end flange 16, by using the output values from the torque sensors 541 to 546. If the external force is not detected (S21: No), then the CPU 301 proceeds to the above-described Step S24. If the external force (or an operation performed by a person) is detected (S21: Yes), then the CPU 301 proceeds to Step S42, detects (obtains) a distance between the teaching pendant 410 and the robot arm 251, and determines whether the distance is within a predetermined threshold range.

If the distance is within the threshold range in Step S42 (S42: Yes), then the CPU 301 proceeds to Step S43, and determines whether a person is contacting the robot arm at a plurality of positions, depending on the contact detection results from the contact sensors 710 to 716 or the torque sensors 541 to 546. If a person is contacting the robot arm at two positions, that is, if a person is operating the robot arm with both hands (S43: Yes), then the CPU 301 returns to Step S41.

If a person is contacting the robot arm at a single (one) position, that is, if a person is operating the robot arm with one hand (S43: No), then the CPU 301 proceeds to Step S44, and changes the damper coefficient D and the spring coefficient K of the force control parameters so that the resistance value is a third resistance value (smaller than a default value). That is, the CPU 301 makes it easy for a user to move the robot arm 251. Then the CPU 301 returns to Step S41, and repeats the above-described processes.

If the distance is not within the threshold range in Step S42 (S42: No), then the CPU 301 proceeds to Step S45, and determines whether a person is contacting the robot arm at a plurality of positions, depending on the contact detection results from the contact sensors 710 to 716 or the torque sensors 541 to 546. If a person is contacting the robot arm at a single (one) position, that is, if a person is operating the robot arm with one hand (S45: No), then the CPU 301 changes the damper coefficient D and the spring coefficient K of the force control parameters so that the resistance value is a first resistance value (default value). Then the CPU 301 returns to Step S41, and repeats the above-described processes.

If a person is contacting the robot arm at a plurality of (two) positions, that is, if a person is operating the robot arm with both hands (S45: Yes), then the CPU 301 proceeds to Step S46, and changes the damper coefficient D and the spring coefficient K of the force control parameters so that the resistance value is a second resistance value (larger than the default value). That is, the CPU 301 makes it difficult for a user to move the robot arm 251. Then the CPU 301 returns to Step S41, and repeats the above-described processes.

As described above, in the seventh embodiment, the degree of ease of moving the robot arm 251 (or the degree of difficulty of moving the robot arm 251) can be changed depending on the distance between the teaching pendant 410 and the robot arm 251. In Step S44, since the teaching pendant 410 is in the vicinity of the robot arm 251 and an operator is operating the robot arm 251 with one hand, it can be determined that the operator is highly likely operating the robot arm 251 with one hand while holding the teaching pendant 410. Thus, the CPU 301 changes the force control parameters so that the resistance value is the third resistance value that makes it most easy for the operator to move the robot arm. With this control, the fatigue of a user who is operating the robot arm 251 with one hand can be reduced.

In Step S46, it can be determined that the teaching pendant 410 is not in the vicinity of the robot arm 251 and an operator is contacting the robot arm 251 with both hands. Thus, it can be determined that another person other than the operator is highly likely holding the teaching pendant 410 and the operator is operating the robot arm 251 with both hands without holding the teaching pendant 410. Thus, the CPU 301 changes the force control parameters so that the resistance value is the second resistance value that makes it most difficult for an operator to move the robot arm. With this control, an operator can easily move the robot arm 251 slightly and precisely with both hands, and the operability for operating the robot arm 251 with both hands can be improved.

In Step S47, it can be determined that the teaching pendant 410 is not in the vicinity of the robot arm 251 and an operator is contacting the robot arm 251 with one hand. Thus, it can be determined that another person other than the operator is highly likely holding the teaching pendant 410 and the operator is operating the robot arm 251 with one hand without holding the teaching pendant 410. Thus, the CPU 301 changes the force control parameters so that the resistance value is the first resistance value (default value). With this control, it can be prevented that the operator moves the robot arm 251 excessively because the operator can move the robot arm 251 easily, and that the operator brings the robot arm 251 into contact with the other person other than the operator. In addition, since it can be determined that the operator is operating the robot arm 251 without holding the teaching pendant 410, the fatigue of the operator can be prevented to some extent even if the resistance value is the first resistance value.

As described above, the resistance value can be more flexibly set by appropriately changing the degree of difficulty of moving the robot arm 251 (or the degree of ease of moving the robot arm 251) in accordance with not only the contact positions of an operator, but also the distance between the teaching pendant 410 and the robot arm 251. In the above description, the force control parameters are changed under two conditions. That is, the force control parameters are changed depending on whether the distance between the teaching pendant 410 and the robot arm 251 is within a threshold range, or whether the distance between the teaching pendant 410 and the robot arm 251 is not within the threshold range. However, the force control parameters may be changed, step by step, in accordance with the distance between the teaching pendant 410 and the robot arm 251. Note that although not illustrated in FIG. 26 as in FIG. 9A, if a state where an operator is operating the robot arm with one hand is changed to a state where the operator is operating the robot arm with both hands S43: Yes), then the CPU 301 changes the force control parameters to the default values. Note that the present embodiment and a modification thereof may be combined with the above-described various embodiments and modifications thereof.

Eighth Embodiment

Figure 27:
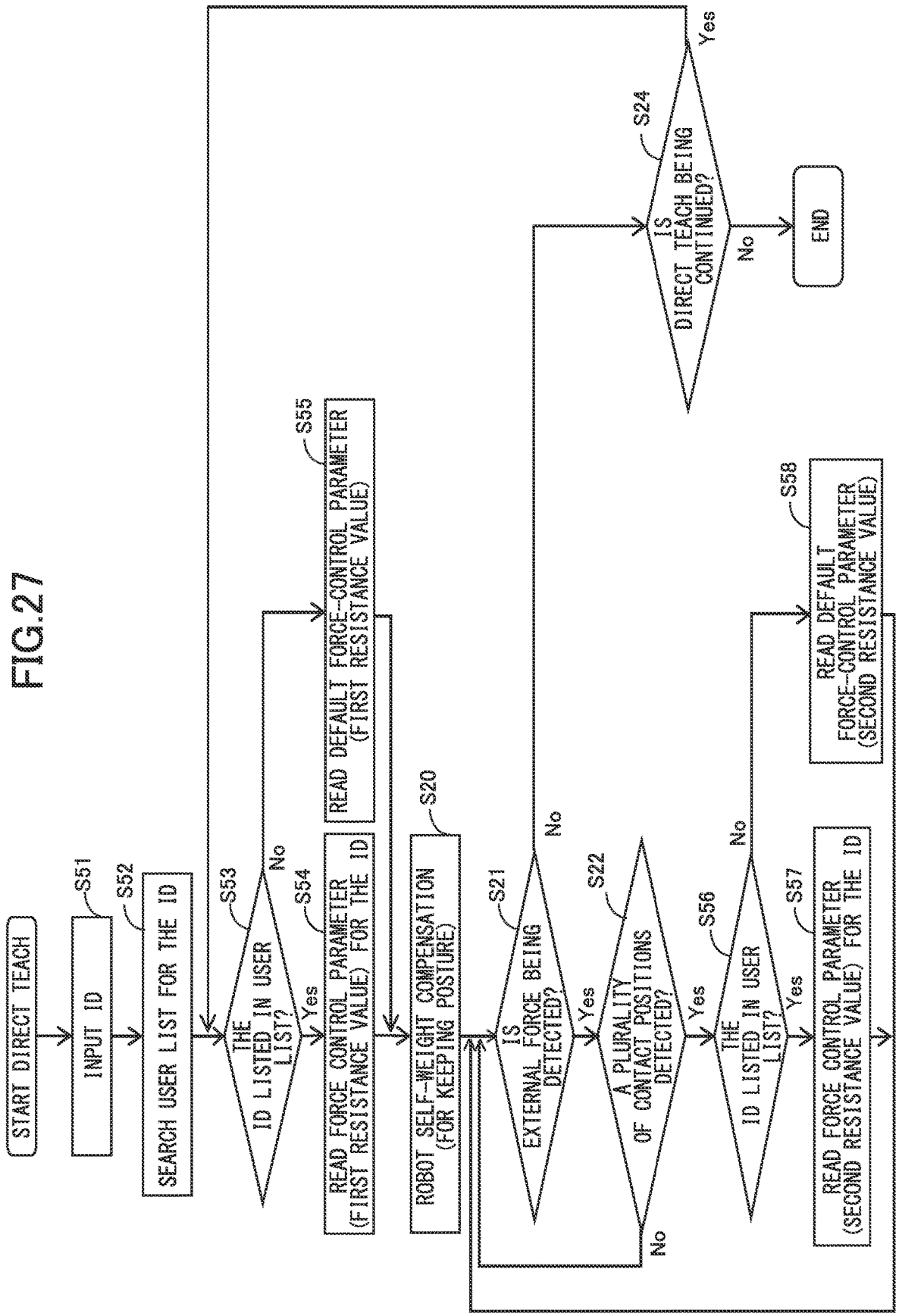
FIG. 27 is a flowchart illustrating the control performed in a direct teach mode of an eighth embodiment.

Next, an eighth embodiment will be described with reference to FIG. 27. In the eighth embodiment, part of the above-described first to seventh embodiments is changed. FIG. 27 is a flowchart illustrating the control performed in a direct teach mode of the eighth embodiment. For simplifying the description, the description for the same processes as those of the above-described various embodiments will be omitted.

When the control apparatus 300 starts the direct teach, the control apparatus 300, in Step S51, urges an operator to input an ID (identification information of the operator) by using the teaching pendant 410. If the ID is inputted in Step S51, the control apparatus 300 refers to a user list, in Step S52, which is pre-stored in the control apparatus 300, and searches the user list for the ID, which is inputted in Step S51. Note that although the ID is used as identification information in the present embodiment, a method of authenticating an operator is not limited to this. For example, the authentication may be performed by using an IC tag. In another case, a one-dimensional bar code or a two-dimensional bar code may be used. Examples of the one-dimensional bar code include JAN, CODE39, Code128, ITF, and NW7. Examples of the two-dimensional bar code include QR code and DataMatrix. In another case, a card in which the data can be written, and a card reader for reading the data of the card may be used. In another case, an image capture apparatus that can recognize the face of an operator may be used, and the operator may be authenticated by using the face information as identification information. In another case, a robot system may include an interface that can obtain information of an operator, such as iris information, brain wave, blood-flow pattern, or fingerprint information. In this case, the biological information, such as iris information, brain wave, blood-flow pattern, or fingerprint information, may be used as identification information.

In Step S53, the CPU 301 determines whether the ID, which is inputted in Step S51, is listed in the user list. If the ID is listed in the user list (S53: Yes), then the CPU 301 proceeds to Step S54, and reads force control parameters stored in advance and corresponding to the ID. The force control parameters correspond to a first resistance value. Then the CPU 301 proceeds to Step S20 and performs the robot self-weight compensation. Since Step 20 for the robot self-weight compensation is the same as Step S20 of the above-described embodiments, the description thereof will be omitted. If the ID is not listed in the user list (S53: No), then the CPU 301 proceeds to Step S55, reads force control parameters corresponding to a first resistance value that is a default value, and performs the robot self-weight compensation in Step S20 (as in the case where the ID is listed in the user list).

The first resistance value stored corresponding to the ID of each operator is set, associated with physical strength and physique of the operator, for example. If an operator has more physical strength, the first resistance value corresponding to the ID of the operator is set larger than the default first resistance value. In contrast, if an operator has less physical strength, the first resistance value corresponding to the ID of the operator is set smaller than the default first resistance value. The criterion of setting the first resistance value is not limited to the physical strength of operators. For example, the first resistance value may be set, corresponding to the ID and skill level of each operator.

In Step S21, the CPU 301 detects the external force applied to the first to the sixth links 10 to 15 or the distal-end flange 16 (that is, an operation performed by a person), depending on the detection results from the torque sensors 541 to 546 of the joints $J_1$ to $J_6$. If the external force is not detected (S21: No), then the CPU 301 proceeds to Step S24, and checks whether the direct teach is being continued. If the direct teach is being continued (S24: Yes), then the CPU 301 returns to Step S53. If the direct teach is not being continued (S24: No), then the CPU 301 ends the direct teach.

If the external force (or an operation performed by a person) is detected in Step S21 (S21: Yes), then the CPU 301 proceeds to Step S22, and determines whether a person is contacting the robot arm at a plurality of positions, depending on the contact detection results from the contact sensors 710 to 716 or the torque sensors 541 to 546. If a person is contacting the robot arm at a single position, that is, if a person is operating the robot arm with one hand (S22: No), then the CPU 301 returns to Step S21.

If a person is contacting the robot arm at a plurality of (two) positions, that is, if a person is operating the robot arm with both hands (S22: Yes), then the CPU 301 proceeds to Step S56, and checks again whether the ID is listed in the user list. If the ID is listed in the user list (S56: Yes), then the CPU 301 proceeds to Step S57, reads force control parameters stored in advance and corresponding to a second resistance value (larger than the first resistance value used for the ID) associated with the ID, and returns to Step S21, If the ID is not listed in the user list (S56: No), then the CPU 301 proceeds to Step S58, reads force control parameters corresponding to a second resistance value that is a default value (the default second resistance value is larger than the default first resistance value), and returns to Step S21 and repeats the above-described processes.

The second resistance value stored corresponding to the ID of each operator is set, associated with physical strength and physique of the operator, for example. If an operator has more physical strength, the second resistance value corresponding to the ID of the operator is set larger than the default second resistance value. In contrast, if an operator has less physical strength, the second resistance value corresponding to the ID of the operator is set smaller than the default second resistance value. The criterion of setting the second resistance value is not limited to the physical strength of operators. For example, the second resistance value may be set, corresponding to the ID and skill level of each operator.

As described above, in the eighth embodiment, a robot is controlled by checking an ID and using force control parameters corresponding to each operator. Thus, if an operator is operating the robot arm with one hand, the CPU 301 sets force control parameters corresponding to the first resistance value determined for the operator and applied when the operator is operating the robot arm with one hand. If an operator is operating, the robot arm with both hands, the CPU 301 sets force control parameters corresponding to the second resistance value determined for the operator and applied when the operator is operating the robot arm with both hands. The second resistance value is larger than the first resistance value applied when the operator operates the robot arm with one hand. With this control, the degree of ease of moving the robot arm 251, or the degree of difficulty of moving the robot arm 251 can be optimized for each operator, by using information on the physical strength, physique, skill level, or the like, which is unique to the operator. Note that although not illustrated in FIG. 27 as in FIG. 9A, if a state where an operator is operating the robot arm with both hands is changed to a state where the operator is operating the robot arm with one hand (S22: No), then the CPU 301 changes the force control parameters to force control parameters corresponding to the first resistance value applied when the operator is operating the robot arm with one hand. In this case, in the eighth embodiment, if the ID is listed in the user list, the CPU 301 changes the force control parameters to force control parameters corresponding to the first resistance value determined for the ID. If the ID is not listed in the user list, the CPU 301 changes the force control parameters to force control parameters corresponding to the default first resistance value. Note that the present embodiment and a modification thereof may be combined with the above-described various embodiments and modifications thereof.

Feasibility of Other Embodiments

In the above-described first to eighth embodiments, if the contact sensors detect that an operator or an object contacts (holds) a robot arm at two positions, the force control parameters are changed. However, the present disclosure is not limited to this. For example, in a case where two or more operators operate a robot, if the operators contact the robot at two or more (that is, a plurality of) positions, the force control parameters may be changed.

In addition, in the first to the eighth embodiments, if an operator contacts a robot at a plurality of positions, the force control parameters are changed from the force control parameters used when the operator contacts the robot at a single position. In contrast to this, if the sensors detect that an operator contacts a robot at a single position, the force control parameters may be changed from default force control parameters used when an operator contacts the robot at a plurality of positions.

In addition, in the first to the eighth embodiments, the description has been made, as one example, for the six-axis articulated robot arm. However, the present disclosure is not limited to this. That is, the number of joints may be any number. Furthermore, although the description has been made for the case where the distal-end flange that connects the end effector and the robot arm is fixed to the sixth link, another joint may be disposed between the connection portion for the end effector and the end effector. In this case, the connection portion for the end effector serves as one link.

In addition, in the first to the eighth embodiments, the description has been made for the case where the hand tool 252 is used, as one example, as an end effector. However, the present disclosure is not limited to this. That is, the end effector may be any tool or device. For example, the end effector may be a grinding tool that grinds a workpiece, a cutting tool that cuts a workpiece, or a welding tool that welds a workpiece. In another case, the end effector may be a screwdriver tool that fasten a workpiece with screws.

Figure 28:
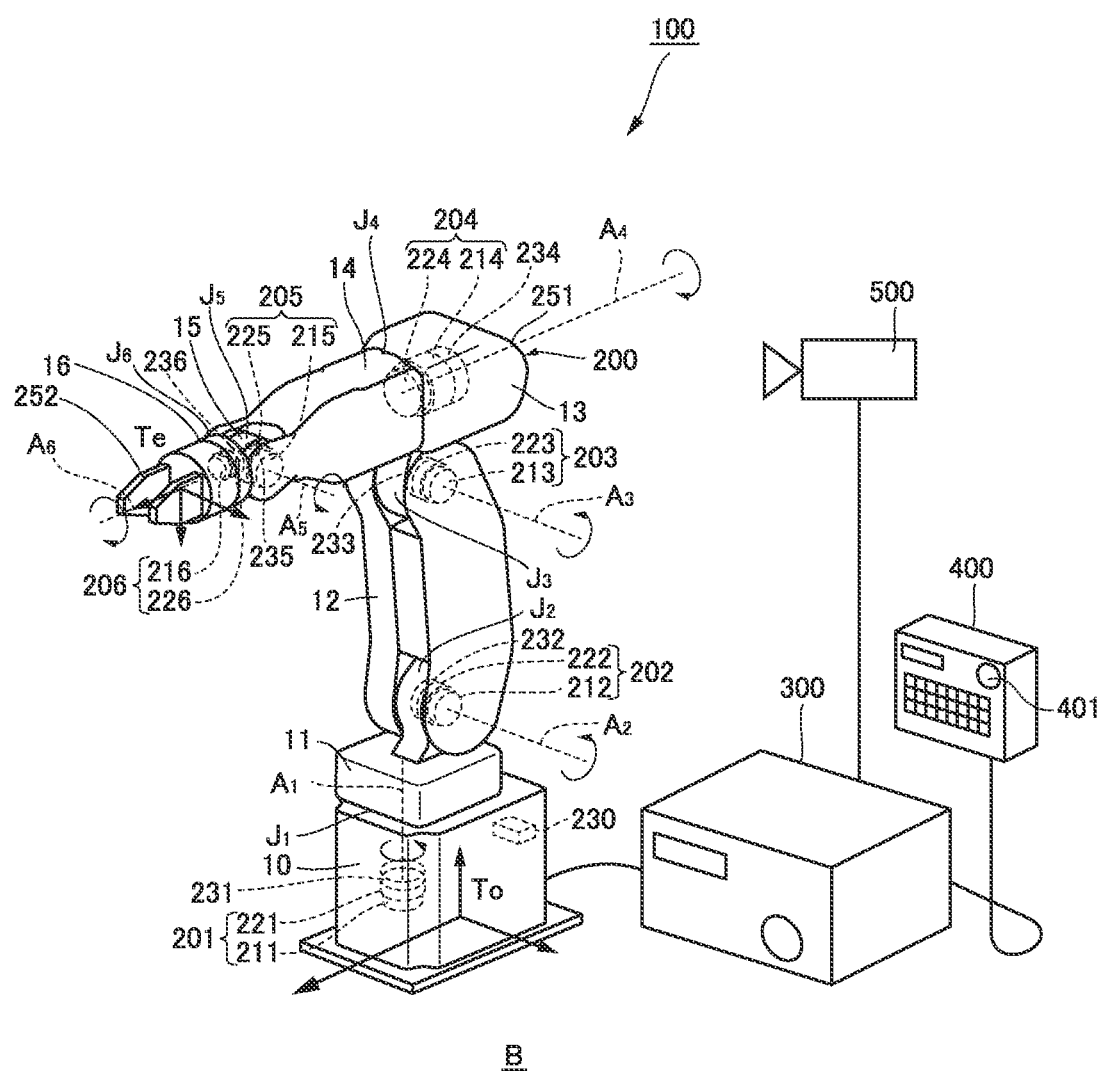
FIG. 28 is a schematic diagram of a robot system that detects a contact position by using an image capture apparatus of an embodiment.

In addition, in the first to the eighth embodiments, the contact sensors 711 to 715 or the torque sensors 541 to 546 are used as contact detection portions. However, the present disclosure is not limited to this. For example, as illustrated in FIG. 28, contact positions at which a user is contacting the robot arm 251 may be obtained by using an image capture apparatus 500 installed at a position at which the image capture apparatus 500 can capture an image of the robot arm 251. In FIG. 28, the image capture apparatus 500 is connected to the control apparatus 300; and the control apparatus 300 includes an image processing portion that performs image processing on an image captured by the image capture apparatus 500. Note that although the description will be made, as an example, for the case where the control apparatus 300 includes the image processing portion, an image processing apparatus may be disposed separately from the control apparatus 300.

FIGS. 29A and 29B illustrate images captured by the image capture apparatus 500 for obtaining contact positions at which an operator is contacting the robot arm 251. FIG. 29A illustrates an example of images, from which it is determined that an operator is contacting the robot arm at a single position. FIG. 29B illustrates an example of images, from which it is determined that an operator is contacting the robot arm at two positions. Preferably, the color of the robot arm 251, the color of the background (in front of which the robot arm 251 is disposed), and the color of a user hand are made different from each other. For example, in a case where a user operates the robot arm 251 with bare hands, the color of the robot arm 251 and the color of the background (in front of which the robot arm 251 is disposed) are made different from the color of the skin of the user. In another case, a user performs work, wearing globes whose color is different from the color of the robot arm 251 and the color of the background (in front of which the robot arm 251 is disposed).

In this manner, the image processing portion performs a known edge-extraction process on an image captured by the image capture apparatus 500, and can easily obtain a rough position (or rough positions) of a hand (or hands) of a user in an image, as illustrated in FIGS. 29A and 29B. As illustrated in FIGS. 29A and 29B, an image in which a rough position (or positions) of a hand (or hands) of a user is indicated by a marker (or markers) 501 may be displayed on the monitor 321 in the direct teach for the robot arm 251. Thus, a contact position (or contact positions) at which a user is contacting the robot arm 251 can be obtained, based on the rough position (positions) of the hand (hands) of the user and the number of contact positions.

In addition, although the description has been made, in the first to the eight embodiments, for the case where the robot arm 251 is an articulated robot arm having a plurality of joints, the number of joints is not limited to the number of joints described in the above-described embodiments. In addition, although the vertically articulated robot arm has been described, as a type of the robot arm, in the above-described embodiments, the same configuration as that described above can also be applied to other types of robots, such as a horizontally articulated robot, a parallel-link robot, and a Cartesian coordinate robot. In addition, the present disclosure can also be applied to an apparatus, instead of the robot arm 251, that can automatically perform expansion and contraction motion, bending and stretching motion, up-and-down motion, right-and-left motion, pivot motion, or combination motion thereof, depending on information data stored in the storage device of the control device.

The present disclosure can also be achieved by providing a program, which performs one or more functions of the above-described embodiments, to a system or a device via a network or a storage medium, and by one or more processors, which are included in the system or the device, reading and executing the program. In addition, the present disclosure can also be achieved by using a circuit, such as an ASIC, which performs one or more functions.

The disclosure of the present specification includes configurations and methods described in the following items.

(Configuration 1)

A robot system comprising:
  a robot including a contact detection portion configured to output a signal in accordance with contact performed by a user; and
  a control portion,
    wherein the control portion is configured to control resistance of the robot applied to the user when the user moves the robot, in accordance with a number of contact positions at which the user contacts the robot, based on a signal from the contact detection portion, (Configuration 2)

The robot system according to configuration 1, wherein the control portion is configured to control the resistance of the robot applied to the user when the user changes posture of the robot, in accordance with the number of contact positions.

(Configuration 3)

The robot system according to configuration 1 or 2, wherein the control portion is configured to control the resistance such that a value of the resistance is a first resistance value if the control portion determines that the number of contact positions is not plural, and control the resistance such that the value of resistance is a second resistance value different from the first resistance value if the control portion determines that the number of contact positions is plural.

(Configuration 4)

The robot system according to configuration 3, wherein the control portion is configured to control the resistance such that the second resistance value is larger than the first resistance value.

(Configuration 5)

The robot system according to any one of configurations 1 to 4, wherein the robot includes a plurality of joints and a plurality of position detection portions configured to output signals in accordance with positions of the joints, and
  wherein the control portion is configured to execute a direct teach mode in which a trajectory of the robot is obtained and stored by using signals detected by the plurality of position detection portions when the robot is moved by the user, and control the resistance of the robot applied to the user when the user moves the robot, in execution of the direct teach mode, (Configuration 6)

The robot system according to any one of configurations 1 to 5, wherein the contact detection portion includes a contact sensor disposed corresponding to each link of the robot and configured to output a signal when the user contacts the link.

(Configuration 7)

The robot system according to any one of configurations 1 to 6, wherein the contact detection portion includes an external-force detection sensor disposed corresponding to each link of the robot and configured to output a signal when external force is applied to the link.

(Configuration 8)

The robot system according to configuration 7, wherein when the control portion detects a hand-side external force applied to a hand-side link located on a hand side of the robot and a base-end-side external force applied to a base-end-side link that is closer to a base end than the hand-side link is, by using a signal from the external-force detection sensor, the control portion performs control such that the resistance value of a joint is larger than the resistance value of an other joint,
  wherein the joint is closer to the base end than the link in which the base-end-side external force has been detected is, and
  wherein the other joint is closer to a hand than the link in which the base-end-side external force has been detected is.

(Configuration 9)

The robot system according to configuration 8, wherein when the base-end-side external force is applied in a direction in which a self weight of the robot is supported, the control portion performs control such that the resistance value of the joint is larger than the resistance value of the other joint,
- wherein the joint is closer to the base end than the base-end-side link is, and
- wherein the other joint is closer to the hand than the base-end-side link is.

(Configuration 10)
The robot system according to configuration 3, wherein when a state where the number of contact positions is plural is changed to a state where the number of contact positions is not plural, the control portion changes the resistance value from the second resistance value to the first resistance value after a predetermined time has elapsed.

(Configuration 11)
The robot system according to any one of configurations 1 to 10, wherein the contact detection portion is disposed at two or more portions of each link of the robot, and
- wherein if it is detected by using a signal from the contact detection portion disposed at two or more portions of one of links of the robot that the user is contacting the one of links at a plurality of positions, the control portion performs control such that the resistance value of the one of links is made larger than the resistance value of the one link when the user is contacting a plurality of links among the links of the robot.

(Configuration 12)
The robot system according to any one of configurations 1 to 11, wherein the robot includes a connection portion via which an end effector is attached to a distal end of a hand-side link, and an end-effector contact detection portion configured to output a signal when the user contacts the end effector, and
- wherein when that the user contacts the end effector is detected from a signal from the end-effector contact detection portion, the control portion performs control such that the resistance of the end effector applied to the user when the user moves the end effector is made larger than the resistance applied to the user when the number of contact positions is plural.

(Configuration 13)
The robot system according to any one of configurations 1 to 10, wherein a handle configured for a user to use for moving the robot is disposed in each link of the robot, and
- wherein the contact detection portion is disposed in each handle.

(Configuration 14)
The robot system according to configuration 13, wherein two or more handles are disposed in each link of the robot.

(Configuration 15)
The robot system according to configuration 13 or 14, wherein the robot includes at least one of an instruction portion or an indicator configured to urge a user to use the handles.

(Configuration 16)
The robot system according to configuration 3, further comprising an operation terminal configured for a user to issue an instruction to the robot,
- wherein if the control portion determines that an enable switch of the operation terminal is on-state, and that the number of contact positions is not plural, the control portion performs control such that the resistance value is a third resistance value smaller than the first resistance value.

(Configuration 17)
The robot system according to configuration 3, further comprising:
- an operation terminal configured for a user to issue an instruction to the robot; and
- a distance sensor configured to obtain a distance between the operation terminal and the robot,
- wherein if the control portion determines that the distance is within a predetermined threshold, and that the user is contacting the robot at a single position, the control portion performs control such that the resistance value is a third resistance value smaller than the first resistance value,
- wherein if the control portion determines that the distance is out of the predetermined threshold, and that the user is contacting the robot at a plurality of positions, the control portion performs control such that the resistance value is the second resistance value, and
- wherein if the control portion determines that the distance is out of the predetermined threshold, and that the user is contacting the robot at a single position, the control portion performs control such that the resistance value is the first resistance value.

(Configuration 18)
The robot system according to configuration 3, further comprising a user interface configured to obtain identification information of the user,
- wherein the control portion performs control such that the first resistance value corresponds to the identification information, and that the second resistance value corresponds to the identification information.

(Configuration 19)
The robot system according to any one of configurations 1 to 18, wherein based on a number of contact positions, the control portion changes resistance of the robot applied to the user when the user starts to move the robot.

(Configuration 20)
A robot system comprising:
- a robot including a contact detection portion configured to output a signal in accordance with contact performed by a user, and an end-effector contact detection portion configured to output a signal when an object contacts an end effector; and
- a control portion,
- wherein when that the object contacts the end effector is detected from a signal from the end-effector contact detection portion, the control portion performs control such that resistance of the end effector applied to the user when the user changes a posture of the end effector is made larger than the resistance of a link of the robot applied to the user when that the user contacts the link is detected from a signal from the contact detection portion.

(Configuration 21)
The robot system according to any one of configurations 1 to 20, wherein the robot includes a plurality of driving sources, and
- wherein the control portion is configured to control the resistance by using the plurality of driving sources.

(Method 22)
A method of controlling a robot system, the robot system including
- a robot including a contact detection portion that outputs a signal in accordance with contact performed by a user, and a control portion,
the method comprising:

controlling, by the control portion, resistance of the robot applied to the user when the user moves the robot, in accordance with a number of contact positions at which the user contacts the robot, based on a signal from the contact detection portion.

(Configuration 23)

A program that causes a computer to execute the method according to method 22.

(Configuration 24)

A computer-readable recording medium storing the program according to configuration 23.

(Method 25)

A method of teaching a robot system, the robot system including a robot including a contact detection portion that outputs a signal in accordance with contact performed by a user, and a control portion, the method comprising:

obtaining, by the control portion, a trajectory of the robot based on movement of the robot performed by the user while the control portion controls resistance of the robot applied to the user when the user moves the robot, in accordance with a number of contact positions at which the user contacts the robot, based on a signal from the contact detection portion.

(Method 26)

A method of manufacturing products by operating a robot system, the robot system including a robot including a contact detection portion that outputs a signal in accordance with contact performed by a user, and a control portion, the method comprising:

obtaining, by the control portion, a trajectory of the robot based on movement of the robot performed by the user while the control portion controls resistance of the robot applied to the user when the user moves the robot in accordance with a number of contact positions at which the user contacts the robot, based on a signal from the contact detection portion, and moving, by the control portion, the robot along the trajectory.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-205340, filed Dec. 17, 2021, and Japanese Patent Application No. 2022-182290, filed Nov. 15, 2022 which are hereby incorporated by reference herein in their entirety.

What is claimed is:

1. A robot system comprising:
a robot including a contact detection portion configured to output a signal in accordance with contact performed by a user; and
a control portion,
wherein the control portion is configured to control resistance of the robot applied to the user when the user moves the robot, in accordance with a number of contact positions at which the user contacts the robot, based on the signal from the contact detection portion.

2. The robot system according to claim 1, wherein the control portion is configured to control the resistance of the robot applied to the user when the user changes posture of the robot, in accordance with the number of contact positions.

3. The robot system according to claim 1, wherein the control portion is configured to control the resistance such that a value of the resistance is a first resistance value if the control portion determines that the number of contact positions is not plural, and control the resistance such that the value of resistance is a second resistance value different from the first resistance value if the control portion determines that the number of contact positions is plural.

4. The robot system according to claim 3, wherein the control portion is configured to control the resistance such that the second resistance value is larger than the first resistance value.

5. The robot system according to claim 1, wherein the robot includes a plurality of joints and a plurality of position detection portions configured to output signals in accordance with positions of the joints, and
wherein the control portion is configured to execute a direct teach mode in which a trajectory of the robot is obtained and stored by using the signals detected by the plurality of position detection portions when the robot is moved by the user, and control the resistance of the robot applied to the user when the user moves the robot, in execution of the direct teach mode.

6. The robot system according to claim 1, wherein the contact detection portion includes a contact sensor disposed corresponding to each link of the robot and configured to output the signal when the user contacts the link.

7. The robot system according to claim 1, wherein the contact detection portion includes an external-force detection sensor disposed corresponding to each link of the robot and configured to output the signal when external force is applied to the link.

8. The robot system according to claim 7, wherein when the control portion detects a hand-side external force applied to a hand-side link located on a hand side of the robot and a base-end-side external force applied to a base-end-side link that is closer to a base end than the hand-side link is, by using the signal from the external-force detection sensor, the control portion performs control such that the resistance value of a joint is larger than the resistance value of another joint,
- wherein the joint is closer to the base end than the link in which the base-end-side external force has been detected is, and
- wherein the other joint is closer to a hand than the link in which the base-end-side external force has been detected is.

9. The robot system according to claim 8, wherein when the base-end-side external force is applied in a direction in which a self weight of the robot is supported, the control portion performs control such that the resistance value of the joint is larger than the resistance value of the other joint,
- wherein the joint is closer to the base end than the base-end-side link is, and
- wherein the other joint is closer to the hand than the base-end-side link is.

10. The robot system according to claim 3, wherein when a state where the number of contact positions is plural is changed to a state where the number of contact positions is not plural, the control portion changes the resistance value from the second resistance value to the first resistance value after a predetermined time has elapsed.

11. The robot system according to claim 1, wherein the contact detection portion is disposed at two or more portions of each link of the robot, and
- wherein if it is detected by using the signal from the contact detection portion disposed at two or more portions of one of links of the robot that the user is contacting the one of links at a plurality of positions, the control portion performs control such that the resistance value of the one of links is made larger than the resistance value of the one link when the user is contacting a plurality of links among the links of the robot.

12. The robot system according to claim 1, wherein based on a number of contact positions, the control portion changes resistance of the robot applied to the user when the user starts to move the robot.

13. The robot system according to claim 1, wherein the robot includes a plurality of driving sources, and
- wherein the control portion is configured to control the resistance by using the plurality of driving sources.

14. A method of controlling a robot system, the robot system including a robot including a contact detection portion that outputs a signal in accordance with contact performed by a user, and a control portion,
the method comprising:
- controlling, by the control portion, resistance of the robot applied to the user when the user moves the robot, in accordance with a number of contact positions at which the user contacts the robot, based on the signal from the contact detection portion.

15. A computer-readable recording medium storing a program that causes a computer to execute the method according to claim 14.

16. A method of teaching a robot system, the robot system including a robot including a contact detection portion that outputs a signal in accordance with contact performed by a user, and a control portion,
the method comprising:
- obtaining, by the control portion, a trajectory of the robot based on movement of the robot performed by the user while the control portion controls resistance of the robot applied to the user when the user moves the robot, in accordance with a number of contact positions at which the user contacts the robot, based on the signal from the contact detection portion.

17. A method of manufacturing products by operating a robot system, the robot system including a robot including a contact detection portion that outputs a signal in accordance with contact performed by a user, and a control portion,
the method comprising:
- obtaining, by the control portion, a trajectory of the robot based on movement of the robot performed by the user while the control portion controls resistance of the robot applied to the user when the user moves the robot, in accordance with a number of contact positions at which the user contacts the robot, based on the signal from the contact detection portion, and
- moving, by the control portion, the robot along the trajectory.

* * * * *